US012706874B2

(12) United States Patent
Sabella et al.

(10) Patent No.: US 12,706,874 B2
(45) Date of Patent: Aug. 11, 2026

(54) EXPOSURE OF UE ID AND RELATED SERVICE CONTINUITY WITH UE AND SERVICE MOBILITY

(71) Applicant: Intel Corporation, Santa Clara, CA (US)

(72) Inventors: Dario Sabella, Gassino (IT); Samar Shailendra, Bangalore (IN); Vivek Kashyap, Portland, OR (US); Xiaopeng Tong, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/227,373

(22) Filed: Jul. 28, 2023

(65) Prior Publication Data

US 2023/0370416 A1 Nov. 16, 2023

Related U.S. Application Data

(60) Provisional application No. 63/393,508, filed on Jul. 29, 2022.

(51) Int. Cl.
*H04L 61/2539* (2022.01)

(52) U.S. Cl.
CPC ................................ *H04L 61/2539* (2013.01)

(58) Field of Classification Search
CPC ............. H04L 61/2539; H04L 61/5014; H04L 61/2567; H04L 61/4511; H04L 61/4588; H04L 61/5076; H04L 61/2514; H04L 61/256
See application file for complete search history.

(56) References Cited

U.S. PATENT DOCUMENTS 10,075,414 B2 * 9/2018 Kweon .................. H04W 8/08
11,553,560 B2 * 1/2023 Kim ...................... H04L 5/0055
11,716,308 B2 * 8/2023 Mas Rosique ...... H04L 61/4511 709/245
12,022,552 B2 * 6/2024 Tang ....................... H04L 69/16
2022/0255996 A1 * 8/2022 Huang .................. H04L 51/224
2024/0348575 A1 * 10/2024 Kim .................... H04L 61/4588
2024/0380848 A1 * 11/2024 Wang .................... H04M 15/66
2025/0158955 A1 * 5/2025 Wang ...................... H04L 61/00

* cited by examiner

*Primary Examiner* — Alex Tran
(74) *Attorney, Agent, or Firm* — Schwegman Lundberg & Woessner, P.A.

(57) ABSTRACT

Techniques for maintaining service continuity in a 5G NR network in communication with a MEC system and an edge application (EDGEAPP) system are disclosed. A notification message originating from a service management function (SMF) of a core network (CN) is decoded at a network exposure function (NEF) of the CN. The notification message includes a UE IP address change of a UE. A private IP address of the UE is determined based on the UE IP address change. A query with the private IP address is encoded for transmission to a NAT server. A response from the NAT server is decoded. The response includes a public IP address and a UE ID of the UE. The public IP address corresponds to the private IP address. A tuple including the UE ID, the public IP address, and the private IP address is generated at the NEF.

20 Claims, 22 Drawing Sheets

EXPOSURE OF UE ID AND RELATED SERVICE CONTINUITY WITH UE AND SERVICE MOBILITY

PRIORITY CLAIM

This application claims the benefit of priority to U.S. Provisional Patent Application No. 63/393,508, filed Jul. 29, 2022, and entitled "Exposure of UE ID and related Service Continuity with UE and Service Mobility," which application is incorporated herein by reference in its entirety.

TECHNICAL FIELD

Embodiments described herein generally relate to data processing, network communication, and communication system implementations, and in particular, to techniques for exposure of user equipment identification (UE ID) and related service continuity with UE and service mobility in a Fifth Generation New Radio (5G NR) (and beyond) network in communication with a multi-access edge computing (MEC) system and an edge application (EDGEAPP) system.

BACKGROUND

Edge computing, at a general level, refers to the transition of compute and storage resources closer to endpoint devices (e.g., consumer computing devices, user equipment, etc.) to optimize total cost of ownership, reduce application (app) latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, initially known as "mobile edge computing," now known as "multi-access edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
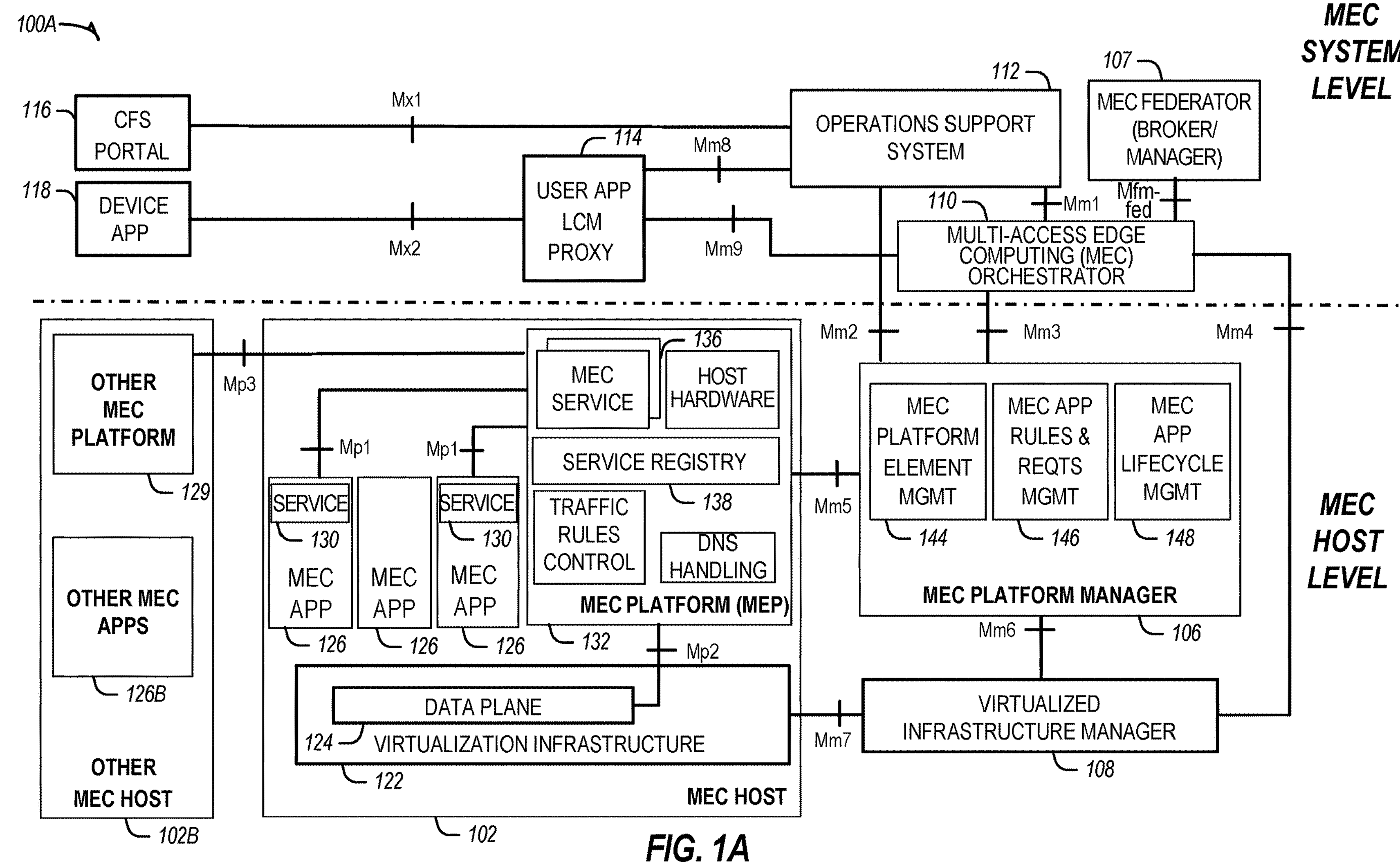
FIG. 1A illustrates a MEC system reference architecture, according to an example.

In the following description, methods, configurations, and related apparatuses are disclosed for supporting exposure of UE ID and related service continuity with UE and service mobility in a 5G NR (and beyond) network in communication with a MEC system and an EDGEAPP system.

The following introduces an approach for exposing UE ID and related service continuity with UE and service mobility in MEC-enabled edge architectures. In the context of edge computing and heterogeneous environments (e.g., EAS/MEC applications (MEC app)) and with UEs/EAS/MEC app mobility, exposing information about UE ID and related mappings with an IP address at the application level can be challenging, even in the presence of network address translation (NAT) function (e.g., a NAT server).

Currently, there are no known solutions for the problem of exposure and handling mapping NEF. Typically, the usage of DNS can be a solution to resolve IP addresses for MEC applications and UEs. In particular, a hierarchical DNS can be used in practical cases, or other solutions are possible. In such cases, full support may need DNS enhancements in the future, both in ETSI MEC and 3GPP. Moreover, the related exposure of this information to AF (also to entities outside the PLMN domain, which are typically in the presence of NAT) is not supported yet in Rel.18, and thus this kind of information is not available at edge applications. Additionally, without DNS, no enablers are present in standards to support the updated information on UE mobility and related availability at the 5G core network (also referred to as 5GC, 5G CN, or CN). In aspects with or without DNS, still, the exposure of such information is currently not available at the application level.

The disclosed techniques include a mechanism to handle the NEF and related procedures need to be updated to maintain the mapping so that changes in IP address (e.g., due to UE mobility) can be reflected if queried based upon UE ID or vice versa. Having this binding up to date at NEF level can allow for the exposure toward the application function (AF) of the core network (CN) (e.g., an EAS/MEC app or by an EES/MEC Platform (MEP)), which can on its turn consume this information, even in cases where consumers are outside the public land mobile network (PLMN) domain (e.g., consumers are in the edge computing service provider (ECSP) domain).

The disclosed techniques further provide a NEF upgrade to maintain the IP address bindings (e.g., IP private address, IP public address, and UE ID) and allocations to be exposed to the AF. In some aspects, the disclosed techniques include the following configurations for this information exposure:

(a) When a DNS is not used, the AF is allowed to obtain the binding via the NEF. The NEF can subscribe to the session management function (SMF) for any UE mobility events.

(b) When a DNS is used (which can be layered in some aspects), the DNS may expose the DNS hierarchy and the AF can use a reverse DNS query. In some aspects, the NEF may subscribe to updates coming directly from the DNS and the AF can obtain the binding via the NEF.

The disclosed techniques can be used to enable edge applications to consume a UE identity service API at the edge of the network. This service can be implemented in EES and MEC platforms. In some aspects, this superset of functionalities and added-value services allows for different implementations and further encourages the adoption of edge computing technologies.

Example MEC Architectures Used with the Disclosed Techniques

FIG. 1A illustrates a MEC system reference architecture (or MEC architecture) 100A providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 010-1 V1.1.1 (2017 October) ("[MEC010-1]"); ETSI GS MEC 010-2 V2.1.1 (2019 November) ("[MEC010-2]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 June) ("[MEC015]"); ETSI GS MEC 028 v2.1.1 (2020 July) ("[MEC028]"); ETSI GS MEC 029 v2.1.1 (2019 July) ("[MEC029]"); ETSI MEC GS 030 v2.1.1 (2020 April) ("[MEC030]"); ETSI GR MEC 035 V3.1.1 (2021 June) ("[MEC035]"); ETSI GS MEC 040 ("[MEC040]"); among many other ETSI MEC standards. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises, and vertical segments. In particular, regarding the automotive sector, applications such as V2X need to exchange data, provide data to aggregation points, and access data in databases that provide an overview of the local situation derived from a multitude of sensors (by various cars, roadside units, etc.).

The MEC architecture 100A includes a MEC host 102, a virtualization infrastructure manager (VIM) 108, a MEC platform manager 106, a MEC orchestrator 110, an operations support system (OSS) 112, a user app proxy 114, a UE app 118 running on UE (not shown), and customer-facing service (CFS) portal 116. The MEC host 102 can include a MEC platform 132 with filtering rules control component, a DNS handling component, a service registry 138, and MEC services 136. The MEC services 136 can include at least one scheduler, which can be used to select resources for instantiating MEC apps 126 (also referred to as NFVs) upon virtualization infrastructure (VI) 122. The MEC apps 126 can be configured to provide services 130, which can include processing network communications traffic of different types associated with one or more wireless connections (e.g., connections to one or more RANs or core network functions) and/or some other services such as those discussed herein. The other MEC host 102B may have the same or similar configuration/implementation as the MEC host 102, and the other MEC apps 126B instantiated within the other MEC host 102B can be similar to the MEC apps 126 instantiated within the MEC host 102. The VI 122 includes a data plane 124 coupled to the MEC platform 132 via an Mp2 interface. Additional interfaces between various network entities of the MEC architecture 100A are illustrated in FIG. 1A.

The MEC system includes three groups of reference points, including "Mp" reference points regarding the MEC platform functionality; "Mm" reference points, which are management reference points; and "Mx" reference points, which connect MEC entities to external entities. The interfaces/reference points in the MEC system may include IP-based connections and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 100A may be access-agnostic and not dependent on a particular deployment. MEC enables the implementation of MEC apps 126 as software-only entities that run on top of a VI 122, which is located in or close to the network edge. A MEC app of the MEC apps 126 is an application that can be instantiated on a MEC host 102 within the MEC system and can potentially provide or consume MEC services 136.

The MEC entities depicted in FIG. 1A can be grouped into MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE(s) and is discussed in more detail below. The MEC host level includes one or more MEC hosts (e.g., MEC host 102 and other MEC hosts 102B) and MEC management entities, which provide the functionality to run MEC apps 126 and the other MEC apps 126B within an operator network or a subset of an operator network. The MEC management entities include various components that handle the management of the MEC-specific functionality of a particular MEC platform (e.g., MEC platform 132), MEC host 102, and the MEC apps 126 to be run.

The MEC platform manager 106 is a MEC management entity including MEC platform element management component 144, MEC app rules and requirements management component 146, and MEC app lifecycle management component 148. The various entities within the MEC architecture 100A can perform functionalities as discussed in [MEC003].

The MEC host 102 is an entity that contains MEC platform 132 and VI 122 which provides compute, storage, and network resources to run MEC apps 126. The VI 122 includes a data plane 124 that executes traffic rules received by the MEC platform 132 and routes the traffic among MEC apps 126, MEC services 136, DNS server/proxy (see e.g., via DNS handling entity which provides the DNS rules), 3GPP network, local networks, and external networks. The data plane 124 may be connected with the (R)AN nodes and the 3GPP core network, and/or may be connected with an access point via a wider network, such as the internet, an enterprise network, or the like.

The MEC platform 132 is a collection of essential functionality required to run MEC apps 126 on a particular VI 122 and enable them to provide and consume MEC services 136, and that can provide itself several MEC services 136. The MEC platform 132 can also provide various services and/or functions, such as offering an environment where the MEC apps 126 can discover, advertise, consume, and offer MEC services 136 (discussed in more detail below), including MEC services 136 available via other platforms when supported. The MEC platform 132 may be able to allow authorized MEC apps 126 to communicate with third-party servers located in external networks. The MEC platform 132 may receive traffic rules from the MEC platform manager 106, applications, or services, and instruct the data plane accordingly (see e.g., traffic rules). The MEC platform 132 may send instructions to the data plane 124 within VI 122 via the Mp2 reference point. The Mp2 reference point between the MEC platform 132 and the data plane 124 of the VI 122 may be used to instruct the data plane 124 on how to route traffic among applications, networks, services, etc. The MEC platform 132 may translate tokens representing UEs in the traffic rules into specific IP addresses. The MEC platform 132 also receives DNS records from the MEC platform manager 106 and configures a DNS proxy/server accordingly. The MEC platform 132 hosts MEC services 136 including the multi-access edge services discussed infra, and provides access to persistent storage and time of day information. Furthermore, the MEC platform 132 may communicate with other MEC platforms 129 of other MEC hosts/servers via the Mp3 reference point.

The VI 122 represents the totality of all hardware and software components which build up the environment in which MEC apps 126 and/or MEC platform 132 are deployed, managed, and executed. The VI 122 may span several locations, and the network providing connectivity between these locations is regarded to be part of the VI 122. The physical hardware resources of the VI 122 include computing, storage, and network resources that provide processing, storage, and connectivity to MEC apps 126 and/or MEC platform 132 through a virtualization layer (e.g., a hypervisor, VM monitor (VMM), or the like). The virtualization layer may abstract and/or logically partition the physical hardware resources of a MEC server in MEC host 102 as a hardware abstraction layer. The virtualization layer may also enable the software that implements the MEC apps 126 and/or MEC platform 132 to use the underlying VI 122 and may provide virtualized resources to the MEC apps 126 and/or MEC platform 132 so that the MEC apps 126 and/or MEC platform 132 can be executed.

The MEC apps 126 are applications that can be instantiated on a MEC host 102 (e.g., server) within the MEC system and can potentially provide or consume MEC services 136. The term "MEC service" refers to a service provided via a MEC platform 132 either by the MEC platform 132 itself or by a MEC app 126. MEC apps 126 may run as a VM on top of the VI 122 provided by the MEC host 102 and can interact with the MEC platform 132 to consume and provide the MEC services 136. The Mp1 reference point between the MEC platform 132 and the MEC apps 126 is used for consuming and providing service-specific functionality. Mp1 provides service registration 138, service discovery, and communication support for various services, such as the MEC services 136 provided by MEC host 102. Mp1 may also provide application availability, session state relocation support procedures, traffic rules, DNS rules activation, access to persistent storage and time of day information, and/or the like.

The MEC apps 126 are instantiated on the VI 122 of the MEC host 102 based on configuration or requests validated by the MEC management (e.g., MEC platform manager 106). The MEC apps 126 can also interact with the MEC platform 132 to perform certain support procedures related to the lifecycle of the MEC apps 126, such as indicating availability, preparing relocation of user state, etc. The MEC apps 126 may have a certain number of rules and requirements associated with them, such as required resources, maximum latency, required or useful services, etc. These requirements may be validated by the MEC management and can be assigned to default values if missing. MEC services 136 are services provided and/or consumed either by the MEC platform 132 and/or MEC apps 126. The service consumers (e.g., MEC apps 126 and/or MEC platform 132) may communicate with particular MEC services 136 over individual APIs (including the various MEC APIs discussed herein). When provided by an application, a MEC service of the MEC services 136 can be registered in a list of services in the service registries 138 to the MEC platform 132 over the Mp1 reference point. Additionally, a MEC app of the MEC apps 126 can subscribe to one or more services (e.g., services 130 or MEC services 136) for which it is authorized over the Mp1 reference point.

Communication between applications and services in the MEC server is designed according to the principles of Service-oriented Architecture (SOA). The communication services allow applications hosted on a single MEC server to communicate with the application-platform services through well-defined APIs and with each other through a service-specific API. The service registry 138 provides visibility of the services available on the MEC host 102. Service registry 138 uses the concept of loose coupling of services, providing flexibility in application deployment. In addition, the service registry presents service availability (status of the service) together with the related interfaces and versions. It is used by applications to discover and locate the endpoints for the services they require, and to publish their service endpoint for other applications to use. The access to the service registry 138 is controlled (authenticated and authorized). Additionally, for the communication services, a lightweight broker-based 'publish and subscribe' messaging protocol is used. The 'publish and subscribe' capability provides one-to-many message distribution and application decoupling. Subscription and publishing by applications are access controlled (authenticated and authorized). The messaging transport should be agnostic to the content of the payload. Mechanisms should be provided to protect against malicious or misbehaving applications.

Examples of MEC services 136 include the V2X Information Service (VIS), Radio Network Information Service (RNIS) [MEC012], Location Service (LS) [MEC013], UE_ID Services [MEC014], BandWidth Management Service (BWMS) [MEC015], WLAN Access Information Service (WAIS) [MEC028], Fixed Access Information Service (FAIS) [MEC029], and/or other MEC services. The RNIS, when available, provides authorized MEC apps 126 with radio network-related information (RNI) and exposes appropriate up-to-date radio network information to the MEC apps 126. The RNI may include, inter alia, radio network conditions, measurement and statistics information related to the user plane, information related to UEs served by the radio node(s) associated with the MEC host 102 (e.g., UE context and radio access bearers), changes on information related to UEs served by the radio node(s) associated with the MEC host 102, and/or the like. The RNI may be provided at the relevant granularity (e.g., per UE, per cell, per period).

The service consumers (e.g., MEC apps 126, MEC platform 132, etc.) may communicate with the RNIS over an RNI API to obtain contextual information from a corresponding RAN. RNI may be provided to the service consumers via a NAN (e.g., (R)AN node, remote radio head (RRH), access point (AP), etc.). The RNI API may support both query and subscription (e.g., a pub/sub) based mechanisms that are used over a Representational State Transfer (RESTful) API or over a message broker of the MEC platform 132 (not shown). A MEC app of the MEC apps 126 may query information on a message broker via a transport information query procedure, wherein the transport information may be pre-provisioned to the MEC app via a suitable configuration mechanism. The various messages communicated via the RNI API may be in XML, JSON, Protobuf, or some other suitable format.

The VIS provides support for various V2X applications. The RNI may be used by MEC apps 126 and MEC platform 132 to optimize the existing services and to provide new types of services that are based on up-to-date information on radio conditions. As an example, a MEC app of the MEC apps 126 may use RNI to optimize current services such as video throughput guidance. In throughput guidance, a radio analytics MEC app of the MEC apps 126 may use MEC services to provide a backend video server with a near real-time indication of the throughput estimated to be available at the radio DL interface in a next-time instant. The throughput guidance radio analytics application computes throughput guidance based on the required radio network information it obtains from a multi-access edge service running on the MEC host 102. RNI may be also used by the MEC platform 132 to optimize the mobility procedures required to support service continuity, such as when a certain MEC app of the MEC apps 126 requests a single piece of information using a simple request-response model (e.g., using RESTful mechanisms) while other MEC apps 126 subscribe to multiple different notifications regarding information changes (e.g., using a pub/sub mechanism and/or message broker mechanisms).

The LS, when available, may provide authorized MEC apps 126 with location-related information, and expose such information to the MEC apps 126. With location-related information, the MEC platform 132 or one or more MEC apps 126 perform active device location tracking, location-based service recommendations, and/or other like services. The LS supports the location retrieval mechanism, e.g., the location is reported only once for each location information request. The LS supports a location subscribe mechanism, for example, the location can be reported multiple times for each location request, periodically, or based on specific events, such as location change. The location information may include, inter alia, the location of specific UEs currently served by the radio node(s) associated with the MEC host 102, information about the location of all UEs currently served by the radio node(s) associated with the MEC host, information about the location of a certain category of UEs currently served by the radio node(s) associated with the MEC host, a list of UEs in a particular location, information about the location of all radio nodes currently associated with the MEC host 102, and/or the like. The location information may be in the form of geolocation, Global Navigation Satellite Service (GNSS) coordinates, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated with a MEC host 102, or a subset thereof, according to a desired deployment. In this regard, the OMA Zonal Presence API provides means for MEC apps 126 to retrieve information about a zone, the access points associated with the zones, and the users that are connected to the access points. In addition, the OMA Zonal Presence API, allows authorized applications to subscribe to a notification mechanism, reporting about user activities within a zone. A MEC host 102 may access location information or zonal presence information of individual UEs using the OMA Zonal Presence API to identify the relative location or positions of the UEs.

The Traffic Management Service (TMS) allows edge applications to get informed of various traffic management capabilities and multi-access network connection information and allows edge applications to provide requirements, e.g., delay, throughput, and loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC apps 126 and specifies static/dynamic up/down bandwidth resources, including bandwidth size and bandwidth priority. MEC apps 126 may use the BWMS to update/receive bandwidth information to/from the MEC platform 132. Different MEC apps 126 running in parallel on the same MEC host 102 may be allocated specific static, dynamic up/down bandwidth resources, including bandwidth size and bandwidth priority. The BWMS includes a bandwidth management (BWM) API to allow registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE-specific traffic rules in the MEC system. When the MEC system supports the UE Identity feature, the MEC platform 132 provides the functionality (e.g., UE Identity API) for a MEC app of the MEC apps 126 to register a tag representing a UE or a list of tags representing respective UEs. Each tag is mapped into a specific UE in the MNO's system, and the MEC platform 132 is provided with the mapping information. The UE Identity tag registration triggers the MEC platform 132 to activate the corresponding traffic rule(s) linked to the tag. The MEC platform 132 also provides the functionality (e.g., UE Identity API) for a MEC app of the MEC apps 126 to invoke a de-registration procedure to disable or otherwise stop using the traffic rule for that user.

The WAIS is a service that provides WLAN access-related information to service consumers within the MEC System. The WAIS is available for authorized MEC apps 126 and is discovered over the Mp1 reference point. The granularity of the WLAN Access Information may be adjusted based on parameters such as information per station, per NAN/AP, or multiple APs (Multi-AP). The WLAN Access Information may be used by the service consumers to optimize the existing services and to provide new types of services that are based on up-to-date information from WLAN APs, possibly combined with information such as RNI or Fixed Access Network Information. The WAIS defines protocols, data models, and interfaces in the form of RESTful APIs. Information about the APs and client stations can be requested either by querying or by subscribing to notifications, each of which includes attribute-based filtering and attribute selectors.

The FAIS is a service that provides Fixed Access Network Information (or FAI) to service consumers within the MEC System. The FAIS is available for the authorized MEC apps 126 and is discovered over the Mp1 reference point. The FAI may be used by MEC apps 126 and the MEC platform 132 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC apps 126 and the MEC platform 132 may consume the FAIS, and both the MEC platform 132 and the MEC apps 126 may be the providers of the FAI. The FAI API supports both queries and subscriptions (pub/sub mechanism) that are used over the RESTful API or alternative transports such as a message bus. Alternative transport may also be used.

The MEC management comprises MEC system-level management and MEC host-level management. The MEC management comprises the MEC platform manager 106 and the VI manager (VIM) 108 and handles the management of MEC-specific functionality of a particular MEC host (e.g., MEC host 102) (e.g., a server) and the applications running on it. In some implementations, some or all of the multi-access edge management components may be implemented by one or more servers located in one or more data centers and may use virtualization infrastructure that is connected with NFV infrastructure used to virtualize NFs or use the same hardware as the NFV infrastructure.

The MEC platform manager 106 is responsible for managing the life cycle of applications including informing the MEC orchestrator 110 of relevant application-related events. The MEC platform manager 106 may also provide MEC platform element management component 144 to the MEC platform 132, manage MEC app rules and requirements management component 146 including service authorizations, traffic rules, DNS configuration, and resolving conflicts, and manage the MEC app lifecycle management component 148. The MEC platform manager 106 may also receive virtualized resources, fault reports, and performance measurements from the VIM 108 for further processing. The Mm5 reference point between the MEC platform manager 106 and the MEC platform 132 is used to perform platform configuration, configuration of the MEC platform element management component 144, MEC app rules and requirements management component 146, MEC app lifecycle management component 148, and management of application relocation.

The VIM 108 may be an entity that allocates, manages, and releases virtualized (compute, storage, and networking) resources of the VI 122, and prepares the VI 122 to run a software image. To do so, the VIM 108 may communicate with the VI 122 over the Mm7 reference point between the VIM 108 and the VI 122. Preparing the VI 122 may include configuring the VI 122 and receiving/storing the software image. When supported, the VIM 108 may provide rapid provisioning of applications, such as described in "Openstack++ for Cloudlet Deployments", available at http://reports-archive.adm.cs.cmu.edu/anon/2015/CMU-CS-15-123.pdf. The VIM 108 may also collect and report performance and fault information about the virtualized resources and perform application relocation when supported. For application relocation from/to external cloud environments, the VIM 108 may interact with an external cloud manager to perform the application relocation, for example, using the mechanism described in "Adaptive VM Handoff Across Cloudlets", and/or possibly through a proxy. Furthermore, the VIM 108 may communicate with the MEC platform manager 106 via the Mm6 reference point, which may be used to manage virtualized resources, for example, to realize the application lifecycle management. Moreover, the VIM 108 may communicate with the MEC orchestrator 110 via the Mm4 reference point, which may be used to manage virtualized resources of the MEC host 102 and to manage application images. Managing the virtualized resources may include tracking available resource capacity, etc.

The MEC system level management includes the MEC orchestrator 110, which has an overview of the complete MEC system. The MEC orchestrator 110 may maintain an overall view of the MEC system based on deployed MEC host 102, available resources, available MEC services 136, and topology. The Mm3 reference point between the MEC orchestrator 110 and the MEC platform manager 106 may be used for the management of the application lifecycle, application rules, and requirements, and keeping track of available MEC services 136. The MEC orchestrator 110 may communicate with the user application lifecycle management proxy (UALMP) 114 via the Mm9 reference point to manage MEC apps 126 requested by UE app 118.

The MEC orchestrator 110 may also be responsible for the on-boarding of application packages, including checking the integrity and authenticity of the packages, validating application rules and requirements and if necessary adjusting them to comply with operator policies, keeping a record of on-boarded packages, and preparing the VIM(s) 108 to handle the applications. The MEC orchestrator 110 may select appropriate MEC host(s) for application instantiation based on constraints, such as latency, available resources, and available services. The MEC orchestrator 110 may also trigger application instantiation and termination, as well as trigger application relocation as needed and when supported.

The Operations Support System (OSS) 112 is the OSS of an operator that receives requests via the Customer Facing Service (CFS) portal 116 over the Mx1 reference point and from UE app 118 for instantiation or termination of MEC apps 126. The OSS 112 decides on the granting of these requests. The CFS portal 116 (and the Mx1 interface) may be used by third parties to request the MEC system to run apps in the MEC system. Granted requests may be forwarded to the MEC orchestrator 110 for further processing. When supported, the OSS 112 also receives requests from UE app 118 for relocating applications between external clouds and the MEC system. The Mm2 reference point between the OSS 112 and the MEC platform manager 106 is used for the MEC platform manager 106 configuration, fault, and performance management. The Mm1 reference point between the MEC orchestrator 110 and the OSS 112 is used for triggering the instantiation and the termination of MEC apps 126 in the MEC system.

The UE app 118 (also referred to as "UE apps", "device applications" or the like) is one or more apps running in a device that can interact with the MEC system via the user application lifecycle management proxy 114. The UE app 118 may be, include, or interact with one or more client applications, which in the context of MEC, is application software running on the device that utilizes functionality provided by one or more specific MEC apps 126. The user app LCM proxy 114 may authorize requests from UE app 118 in the UE and interacts with the OSS 112 and the MEC orchestrator 110 for further processing of these requests. The term "lifecycle management," in the context of MEC, refers to a set of functions required to manage the instantiation, maintenance, and termination of a MEC app instance. The user app LCM proxy 114 may interact with the OSS 112 via the Mm8 reference point and is used to handle UE app 118 requests for running applications in the MEC system. A user app may be a MEC app of the MEC apps 126 that is instantiated in the MEC system in response to a request of a user via an application running in the UE (e.g., UE app 118). The user app LCM proxy 114 allows UE app 118 to request on-boarding, instantiation, termination of user applications, and when supported, relocation of user applications in and out of the MEC system. It also allows informing the user apps about the state of the user apps. The user app LCM proxy 114 is only accessible from within the mobile network and may only be available when supported by the MEC system. A UE app 118 may use the Mx2 reference point between the user app LCM proxy 114 and the UE app 118 to request the MEC system to run an application in the MEC system or to move an application in or out of the MEC system. The Mx2 reference point may only be accessible within the mobile network and may only be available when supported by the MEC system.

To run a MEC app of the MEC apps 126 in the MEC system, the MEC orchestrator 110 receives requests triggered by the OSS 112, a third party, or a UE app 118. In response to receipt of such requests, the MEC orchestrator 110 selects a MEC host 102 (server) to host the MEC apps 126 for computational offloading, etc. These requests may include information about the application to be run, and possibly other information, such as the location where the application needs to be active, other application rules and requirements, as well as the location of the application image if it is not yet on-boarded in the MEC system.

The MEC orchestrator 110 may select one or more MEC hosts (e.g., servers) for computationally intensive tasks. The selected one or more MEC hosts may offload computational tasks of a UE app 118 based on various operational parameters, such as network capabilities and conditions, computational capabilities and conditions, application requirements, and/or other like operational parameters. The application requirements may be rules and requirements associated to/with one or more MEC apps 126, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC apps 126 to be able to run; multi-access edge services that the MEC apps 126 can take advantage of, if available; connectivity or mobility support/requirements (e.g., application state relocation, application instance relocation); required multi-access edge features, such as VM relocation support or UE identity; required network connectivity (e.g., connectivity to applications within the MEC system, connectivity to local networks, or to the Internet); information on the operator's MEC system deployment or mobile network deployment (e.g., topology, cost); requirements on access to user traffic; requirements on persistent storage; traffic rules; DNS rules; etc.

The MEC orchestrator 110 considers the requirements and information listed above and information on the resources currently available in the MEC system to select one or several MEC hosts (e.g., MEC host 102) (e.g., servers) to host MEC apps 126 and/or for computational offloading. After one or more MEC services 136 are selected, the MEC orchestrator 110 requests the selected MEC host(s) to instantiate the application(s) or application tasks. The actual algorithm used to select the MEC hosts depends on the implementation, configuration, and/or operator deployment. The selection algorithm(s) may be based on the task offloading criteria/parameters, for example, by considering network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC orchestrator 110 may decide to select one or more new MEC hosts to act as a master node and initiates the transfer of an application instance or application-related state information from the one or more source MEC hosts (e.g., MEC host 102) to the one or more target MEC hosts.

Additionally, a MEC system can be flexibly deployed depending on the use case/vertical segment/information to be processed. Some components of the MEC system can be co-located with other elements of the system. As an example, in certain use cases (e.g., enterprise), a MEC app 126 may need to consume a MEC service locally, and it may be efficient to deploy a MEC host locally equipped with the needed set of APIs. In another example, deploying a MEC host 102 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, to set up transport networks (e.g., for CDN-based services).

Additionally, FIG. 1A illustrates a MEC system reference architecture variant for a MEC federation. Here, this shows a single MEC Federation functional entity, namely, a MEC Federator 107 (providing the roles of a MEC Federation Manager (MEFM) and a MEC Federation Broker (MEFB)), and the Mfm-fed interface/reference point connecting the MEC Federator 107 to the MEC orchestrator 110. The federator may be divided into separate entities in some examples.

Figure 1B:
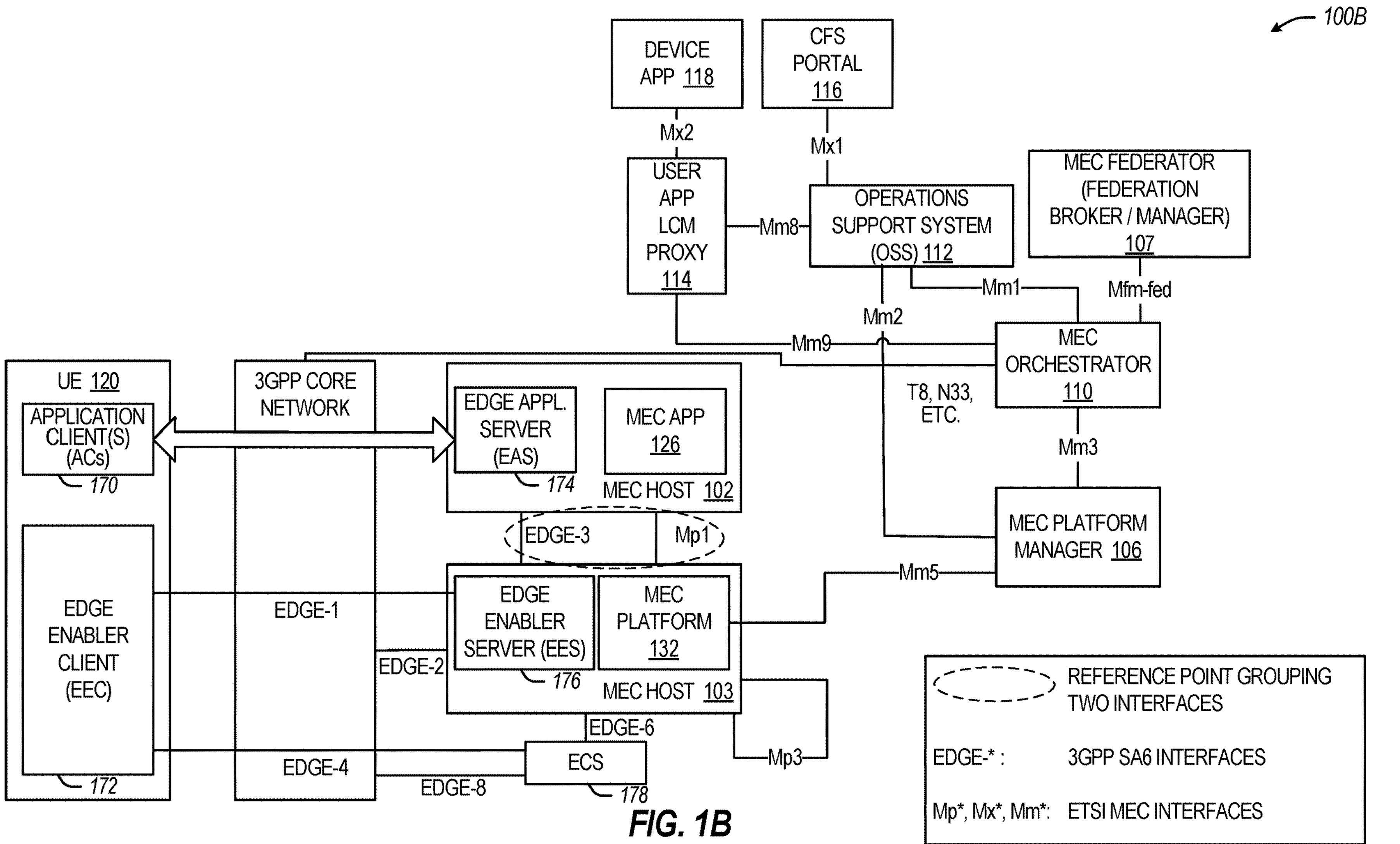
FIG. 1B illustrates an adaptation of the MEC system reference architecture for supporting different modes of operations including interoperability with an EDGEAPP architecture, according to an example.

FIG. 1B illustrates a Synergized MEC architecture 100B supporting different modes of operations and leveraging 3GPP (SA6 EDGEAPP) and ETSI ISG MEC (see e.g., ETSI White Paper #36, "Harmonizing standards for edge computing—A synergized architecture leveraging ETSI ISG MEC and 3GPP specification", 1st Ed., ISBN No. 979-10-92620-35-5 (July 2020) ("[ETSIWP36]")). FIG. 1B further illustrates an adaptation of such synergized architecture, considering the MEC Federation variant of the reference MEC architecture and the 3GPP EDGEAPP architecture such as specified in 3GPP TS 23.558 v17.0.0 (2021 Jun. 28) ("[TS23558]").

On the left side of FIG. 1B, devices (e.g., UE 120) run application clients (ACs) 170 which either use the DNS to discover application servers (Edge Application Server (EAS) 174 in 3GPP SA6 terminology or MEC application 126 in ETSI ISG MEC terminology) or use the Edge Enabler Client (EEC) 172 to perform the discovery according to the SA6 EDGEAPP architecture. The EAS 174 and MEC application 126 can be configured in MEC host 102.

Towards the middle of FIG. 1B, a platform (e.g., Edge Enabler Server (EES) 176 in 3GPP SA6 and MEC platform 132 in ETSI ISG MEC) provides functionality about mediating access to network services, application authorization, application's service registration, application's service discovery, context transfer, etc. A given implementation can combine functions specified by ETSI ISG MEC and ones specified by 3GPP SA6. The platform typically exposes APIs to edge cloud applications (MEC application or Edge Application Server). EDGE-3 and Mp1 offer complementary API functions, therefore can be considered to be part of a single reference point from an application developer perspective. EES 176 and MEC platform 132 can be configured in MEC host 103. The MEC host 102 and MEC host 103 can be coupled to an edge configuration server (ECS) 178.

Towards the right of FIG. 1B, functionalities specified by ETSI ISG MEC include management and orchestration of the MEC platforms and OSS functions supporting access to portals offered to application service providers.

EDGE-3 and Mp1 provide service registration and service discovery features which allow an edge cloud application to register services exposed by this application and their subsequent discovery and use by other applications. The exposed services can be network services, subject to their availability at the core or access network level. The common capabilities may be harmonized through the adoption of the Common API Framework (CAPIF) such as specified in 3GPP TS 23.222 v17.5.0 (2021 Jun. 24) ("[TS23222]"). EDGE-9 and Mp3 are both at an early stage of development. Both are intended to assist in context migration.

The following interfaces are about a simple endorsement of SA2 interfaces (e.g., Network Exposure Function/Service Capability Exposure Function, NEF/SCEF): EDGE-2, EDGE-7, EDGE-8, M3GPP-1. According to 3GPP SA6 specification, edge services are exposed to the application clients by the Edge Configuration Server (ECS) and Edge Enabler Server (EES) via the Edge Enabler Client (EEC) in the UE. Each EEC is configured with the address of the ECS, which is provided by either the MNO or the Edge Computing Service Provider. Deployment options discussed in ETSI White Paper #36, "Harmonizing standards for edge computing—A synergized architecture leveraging ETSI ISG MEC and 3GPP specifications", July 2020, may implement all or a subset of the features of the synergized architecture as shown in subsequent sections.

The disclosed EDGEAPP architecture and ETSI ISG MEC architecture can complement each other as illustrated in FIG. 1B. More specifically, both EAS 174 and MEC application (or MEC app) 126 are application servers and can provide similar application-specific functionalities. In some aspects, the EAS 174 and the MEC app 126 can be collocated. Additionally, both EES 176 and MEC platform 132 (also referred to as MEP) provide application support capabilities for the application servers. In some aspects, the EES 176 and the MEC platform 132 can be collocated.

In edge computing systems, EDGEAPP architecture elements (as well as ETSI MEC system) can be seen by 5GC as Application Functions (AFs). In many practical cases, the implementation of an edge computing infrastructure can be in the Edge Computing Service Provider (ECSP) domain, and possibly also include some Network Address Translation (NAT) functions. In some aspects, NAT is deployed to improve the available IP space and to protect the identity of the UE.

Moreover, UEs are also typically moving, and in principle EASs (and MEC apps) may need to "follow" that mobility, to maintain a low latency and all the benefits of operating in edge computing environments.

Figure 1C:
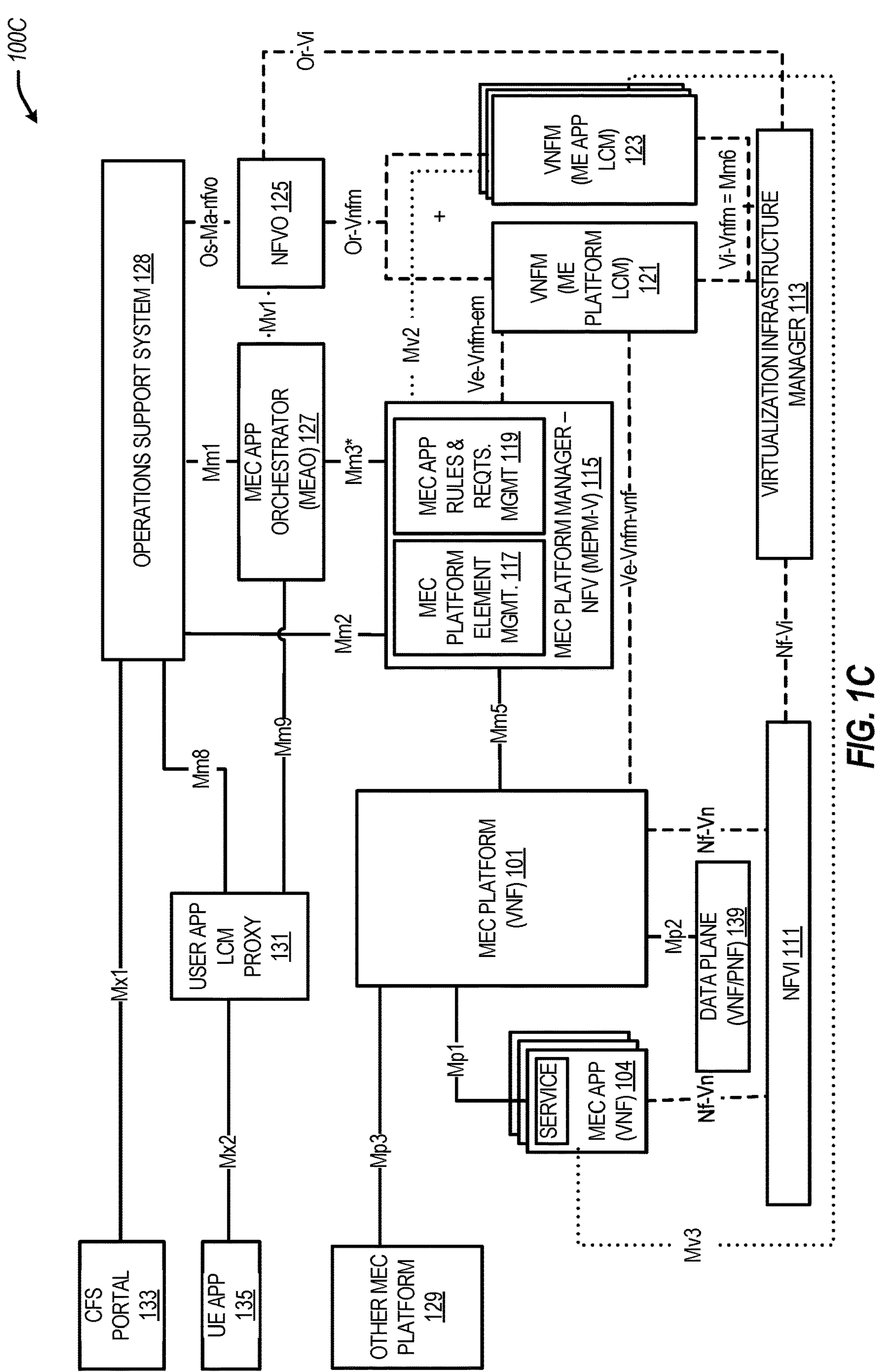
FIG. 1C illustrates a MEC reference architecture in an NFV environment, according to an example.

FIG. 1C illustrates a MEC reference architecture 100C in an NFV environment. The MEC architecture 100C includes a MEC platform 101, a MEC platform manager-NFV (MEPM-V) 115, a data plane 139, an NFV infrastructure (NFVI) 111, VNF managers (VNFMs) 121 and 123, NFV orchestrator (NFVO) 125, a MEC app orchestrator (MEAO) 127, an OSS 128, a user app LCM proxy 131, a UE app 135, and a CFS portal 133. The MEPM-V 115 can include a MEC platform element management 117 and MEC app rules and requirements management 119. The MEC platform 101 can be coupled to another MEC platform 129 via an Mp3 interface.

The MEC platform 101 is deployed as a VNF. The MEC applications can appear like VNFs towards the ETSI NFV Management and Orchestration (MANO) components. This allows the re-use of ETSI NFV MANO functionality. The full set of MANO functionality may be unused and certain additional functionality may be needed. Such a specific MEC app is denoted by the name "MEC app VNF" or "MEA-VNF". The virtualization infrastructure is deployed as an NFVI 111 and its virtualized resources are managed by the virtualized infrastructure manager (VIM) 113. For that purpose, one or more of the procedures defined by ETSI NFV Infrastructure specifications can be used (see e.g., ETSI GS NFV-INF 003 V2.4.1 (2018 February), ETSI GS NFV-INF 004 V2.4.1 (2018 February), ETSI GS NFV-INF 005 V3.2.1 (2019 April), and ETSI GS NFV-IFA 009 V1.1.1 (2016 July) (collectively "[ETSI-NFV]")). The MEC applications 104 can be managed like individual VNFs, allowing a MEC-in-NFV deployment can delegate certain orchestration and LCM tasks to the NFVO 125 and VNFMs 121 and 123, as defined by ETSI NFV MANO.

When MEC platform 101 is implemented as a VNF (e.g., MEC platform VNF), the MEPM-V 115 may be configured to function as an Element Manager (EM). The MEAO 127 uses the NFVO 125 for resource orchestration, and for orchestration of the set of MEA-VNFs as one or more NFV Network Services (NSs). The MEPM-V 115 delegates the LCM part to one or more VNFMs 121 and 123. A specific or generic VNFM 121, 123 is/are used to perform LCM. The MEPM-V 115 and the VNFM (ME platform LCM) 121 can be deployed as a single package as per the ensemble concept in 3GPP TR 32.842 v13.1.0 (2015 Dec. 21) ("[TR32842]"), or that the VNFM is a Generic VNFM as per [ETSI-NFV] and the MEC Platform VNF and the MEPM-V 115 are provided by a single vendor.

The Mp1 reference point between a MEC app (e.g., one of the MEC applications 104) and the MEC platform 101 can be optional for the MEC app unless it is an application that provides and/or consumes a MEC service. The Mm3* reference point between MEAO 127 and the MEPM-V 115 is based on the Mm3 reference point (see e.g., [MEC003]). Changes may be configured to this reference point to cater to the split between MEPM-V 115 and VNFM (ME applications LCM) 123. The following new reference points (Mv1, Mv2, and Mv3) are introduced between elements of the ETSI MEC architecture and the ETSI NFV architecture to support the management of MEC app VNFs.

The following reference points are related to existing NFV reference points, but only a subset of the functionality may be used for ETSI MEC, and extensions may be necessary. Mv1 is a reference point connecting the MEAO 127 and the NFVO 125, and is related to the Os-Ma-nfvo reference point as defined in ETSI NFV). Mv2 is a reference point connecting the VNFM 123 that performs the LCM of the MEC app VNFs with the MEPM-V 115 to allow LCM-related notifications to be exchanged between these entities. Mv2 is related to the Ve-Vnfm-em reference point as defined in ETSI NFV, but may include additions, and might not use all functionality offered by the Ve-Vnfm-em. Mv3 is a reference point connecting the VNFM 123 with the MEC app VNF instance to allow the exchange of messages (e.g., related to MEC app LCM or initial deployment-specific configuration). Mv3 is related to the Ve-Vnfm-vnf reference point, as defined in ETSI NFV, but may include additions, and might not use all functionality offered by Ve-Vnfm-vnf.

The following reference points are used as they are defined by ETSI NFV: Nf-Vn reference point connects each MEC app VNF with the NFVI 111. The Nf-Vi reference point connects the NFVI 111 and the VIM 113. The Os-Ma-nfvo reference point connects the OSS 128 and the NFVO 125 and is primarily used to manage NSs (e.g., several VNFs connected and orchestrated to deliver a service). The Or-Vnfm reference point connects the NFVO 125 and the VNFM (MEC Platform LCM) 121 and is primarily used for the NFVO 125 to invoke VNF LCM operations. Vi-Vnfm reference point connects the VIM 113 and the VNFM (MEC Platform LCM) 121 and is primarily used by the VNFM 121 to invoke resource management operations to manage cloud resources that are needed by the VNF (it is assumed in an NFV-based MEC deployment that this reference point corresponds 1:1 to M5). The Or-Vi reference point connects the NFVO 125 and the VIM 113 and is primarily used by the NFVO 125 to manage cloud resources capacity. The Ve-Vnfm-em reference point connects the VNFM (MEC Platform LCM) 121 with the MEPM-V 115. The Ve-Vnfm-vnf reference point connects the VNFM (MEC Platform LCM) 121 with the MEC Platform VNF.

Figure 2:
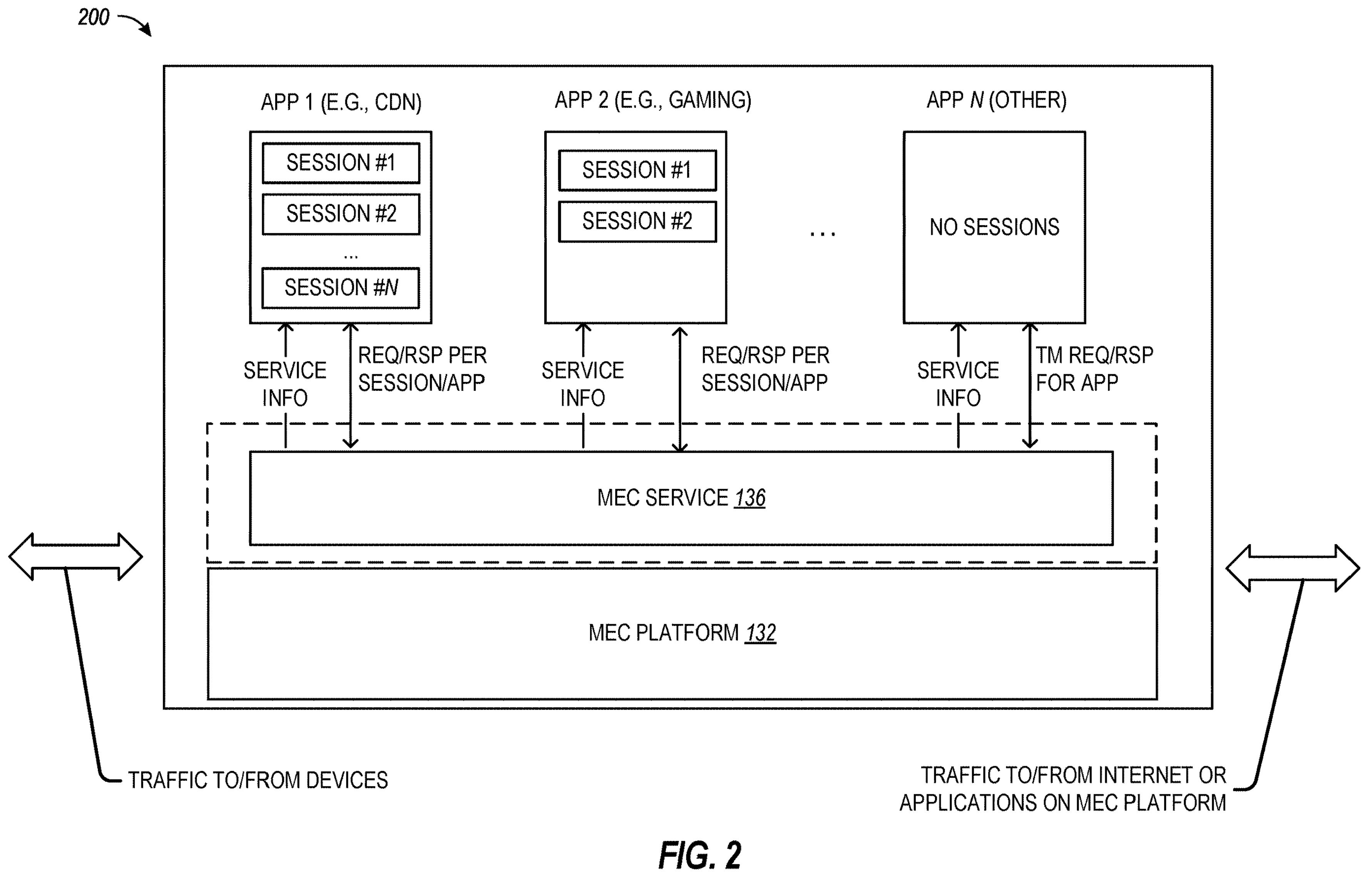
FIG. 2 illustrates an example MEC service architecture, according to an example.

FIG. 2 illustrates an example MEC service architecture 200. MEC service architecture 200 includes the MEC services 136, MEC platform 132 (e.g., corresponding to MEC platform 132), and applications (Apps) 1 to N (where N is a number). As an example, App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as MEC platform 132) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE and a MEC app instantiated by the MEC platform 132, and/or the like. A session may begin when App execution is started or initiated and ends when the App exits or terminates execution. Additionally, a session may begin when a connection is established and may end when the connection is terminated. Each App session may correspond to a currently running App instance. Additionally, each session may correspond to a Protocol Data Unit (PDU) session or a multi-access (MA) PDU session. A PDU session is an association between a UE 120 and a DN that provides a PDU connectivity service, which is a service that provides for the exchange of PDUs between a UE 120 and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data that uniquely identifies a session, and each App (or App instance) may be associated with an App ID (or App instance ID) which is data that uniquely identifies an App (or App instance).

The MEC services 136 provides one or more MEC services to MEC service consumers (e.g., Apps 1 to N). The MEC services 136 may optionally run as part of the platform (e.g., MEC platform 132) or as an application (e.g., MEC app). Different Apps 1 to N, whether managing a single instance or several sessions (e.g., CDN), may request specific service info per their requirements for the whole application instance or different requirements per session. The MEC services 136 may aggregate all the requests and act in a manner that will help optimize the BW usage and improve the Quality of Experience (QoE) for applications.

The MEC services 136 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics concerning the identified request target, and responds to that request with one or more response messages. A client constructs request messages to communicate specific intentions, examines received responses to see if the intentions were carried out, and determines how to interpret the results. The target of an HTTP request is called a "resource." Additionally, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For HTTP, a "representation" is information that is intended to reflect a past, current, or desired state of a given resource, in a format that can be readily communicated via the protocol. A representation comprises a set of representation metadata and a potentially unbounded stream of representation data. Additionally, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests and constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see, e.g., IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under the control of the deployment, whereas the remaining parts of the URI are under the control of the API specification. In the above root, "apiRoot" and "apiName" are discovered using the service registry (see e.g., service registry 138 in FIG. 1A). It includes the scheme ("http" or "https"), host and optional port, and an optional prefix string. For a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

Technical Problems in MEC Federation and Operator Platform Environments

In the context of a deployed system (such as the MEC system depicted in FIGS. 1A-2, the edge computing systems depicted in FIGS. 12-15, or variations of distributed computing architectures) the present techniques and configurations provide the capability for application coordination, registration, management, and information exchange, among other functions.

As context for the following discussion, according to ETSI GR MEC 035 V3.1.1 (2021 June) ("[MEC035]"), a Multi-access Edge Computing (MEC) federation is a federated model of MEC systems enabling shared usage of MEC services and applications. This definition is based on standardized solutions to address the Operator Platform (OP) Telco Edge requirements discussed in GSMA OPG Permanent Reference Document (PRD), "Operator Platform Telco Edge Requirements", GSMA Assoc., Official Document OPG.02, version 1 (29 Jun. 2021) ("[OPG02]"). The concept of the Operator Platform (OP) developed by GSMA OPG (which is composed of over 40 of the world's largest operators and over 25 ecosystem partners) is that edge compute from operators can be federated and exposed in the same fashion to create a multi-domain capability that could be presented to customers/developers. Moreover, the exploitation of the edge can be enhanced by utilizing network resources (e.g., device location, user plane control, mobility, etc.).

The disclosed techniques can be based on the current standards in ETSI MEC and 3GPP and provide an evolutionary migration of current standard elements by leveraging the synergized architecture supported by these standard bodies [e.g., as specified in ETSI-WP-36]. It will be understood that the following approaches may also be adapted for other standards and architectures.

Applicability to Operator Platform and MEC Frameworks

Figure 3:
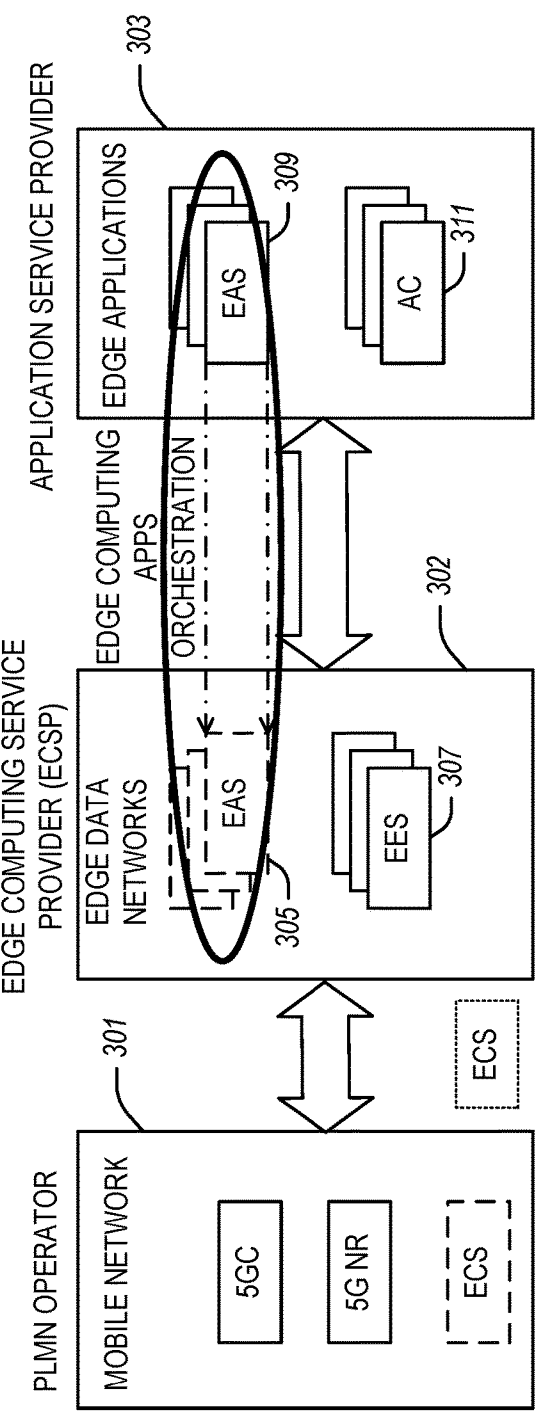
FIG. 3 depicts relationships between operators and service providers on mobile networks, according to an example.

The domain of the Operator Platform is commonly separated from the network domain (e.g., 4G vs 5G networks). This view is also coherent with ETSI MEC and 3GPP. MEC (seen by 5GS as an AF) is often portrayed as being located outside the 3GPP domain. For example, FIG. 3 depicts that according to 3GPP [e.g., TR-28.814] the 5GC is in the PLMN domain of mobile network 301, while 3GPP EDGE-APP entities like EES 307 (e.g., hosted at an edge computing service provider 302) and EAS (e.g., EAS 309 hosted by an application service provider 303 or EAS 305 hosted by the edge computing service provider 302 (or ECSP)) are outside this domain.

Even in GSMA OPG [e.g., GSMA Operator Platform Telco Edge Requirements 2022, April 2022] settings, the OP can be seen by 5GS as an AF. In such contexts, the following provides implementations of an OP instance in synergized ETSI/3GPP systems, which will satisfy the GSMA requirements for the MEC federation.

In particular, by referring to the OP architecture defined by GSMA OPG (e.g., captured in GSMA OP PRD v2.0 [GSMA Operator Platform Telco Edge Requirements 2022, April 2022]), an interoperability problem arises from federating OP instances: multiple systems can have different edge computing platforms and related orchestrators, while a single and common interface should be standardized to define the OP-NBI. Thus, for a federation of OPs, a question is raised of what extensions to the current standard architectures are required so that the lifecycle of an edge application instance of any kind can be managed in such a heterogeneous OP federation environment.

In some aspects, edge computing service provider 302 is responsible for the deployment of edge data networks (EDNs) that contain EAS and EES. In some aspects, the application service provider 303 (or ASP) is responsible for the creation of EAS 309.

In some aspects, application clients 311 (or ACs) represent the edge computing application running in the server and the UE client.

In some aspects, the illustrated ECS provides functionalities needed for the EEC to connect with an EES 307. The ECS may reside in the PLMN domain (e.g., mobile network 301) or the ECSP domain (e.g., edge computing service provider 302).

In the communication environment 300 of FIG. 3, the UE (and thus its application client (AC)) is subject to mobility, which can result in a change in the IP address over time. This may be implying that various AMFs can be connected to the UE, while the session management function (SMF) is the entity knowing all the information related to Protocol Data Unit (PDU) sessions, and configures NG tunnels, allocates IP addresses with DHCP, and configures traffic steering (e.g., towards a third party or an edge cloud). In some aspects, there can be multiple SMFs associated with a UE, though only one per slice.

In this regard, the SMF can be considered a key element in the 5GC (i.e., within the PLMN domain) that may provide optimal knowledge of the UE identifier (UE ID) and related IP address.

Figure 4A:
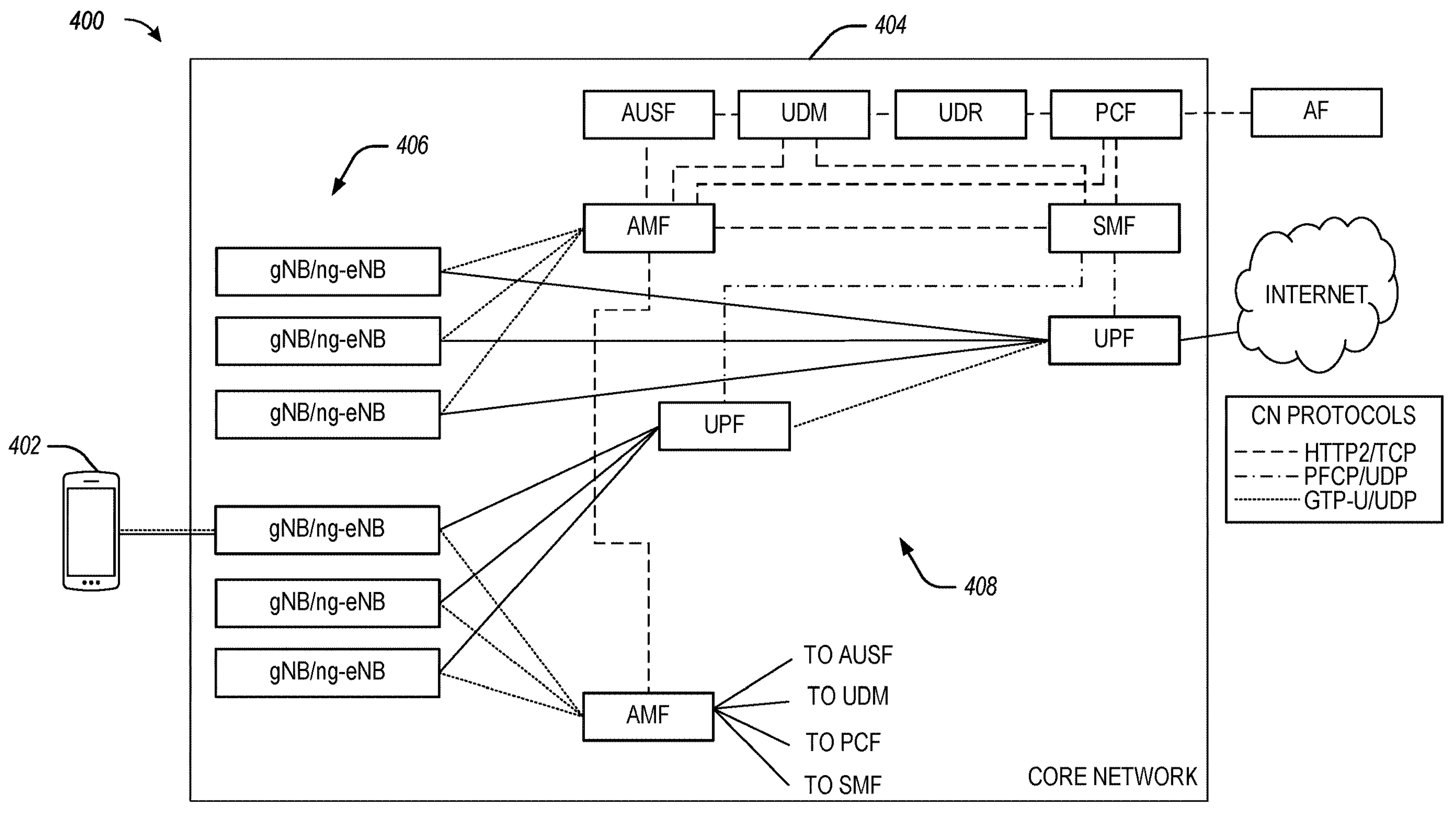
FIG. 4A depicts the interface representation of a 5G core network (CN), according to an example.

FIG. 4A depicts diagram 400 of the interface representation of a 5G core network (CN), according to an example. Referring to FIG. 4A, UE 402 is connected to at least one base station of available base stations 406 (e.g., gNBs or ng-eNBs) in CN 404 (e.g., a 5GC). CN 404 can include CN functions 408 (e.g., as illustrated in FIG. 4A and FIG. 4B).

Figure 4B:
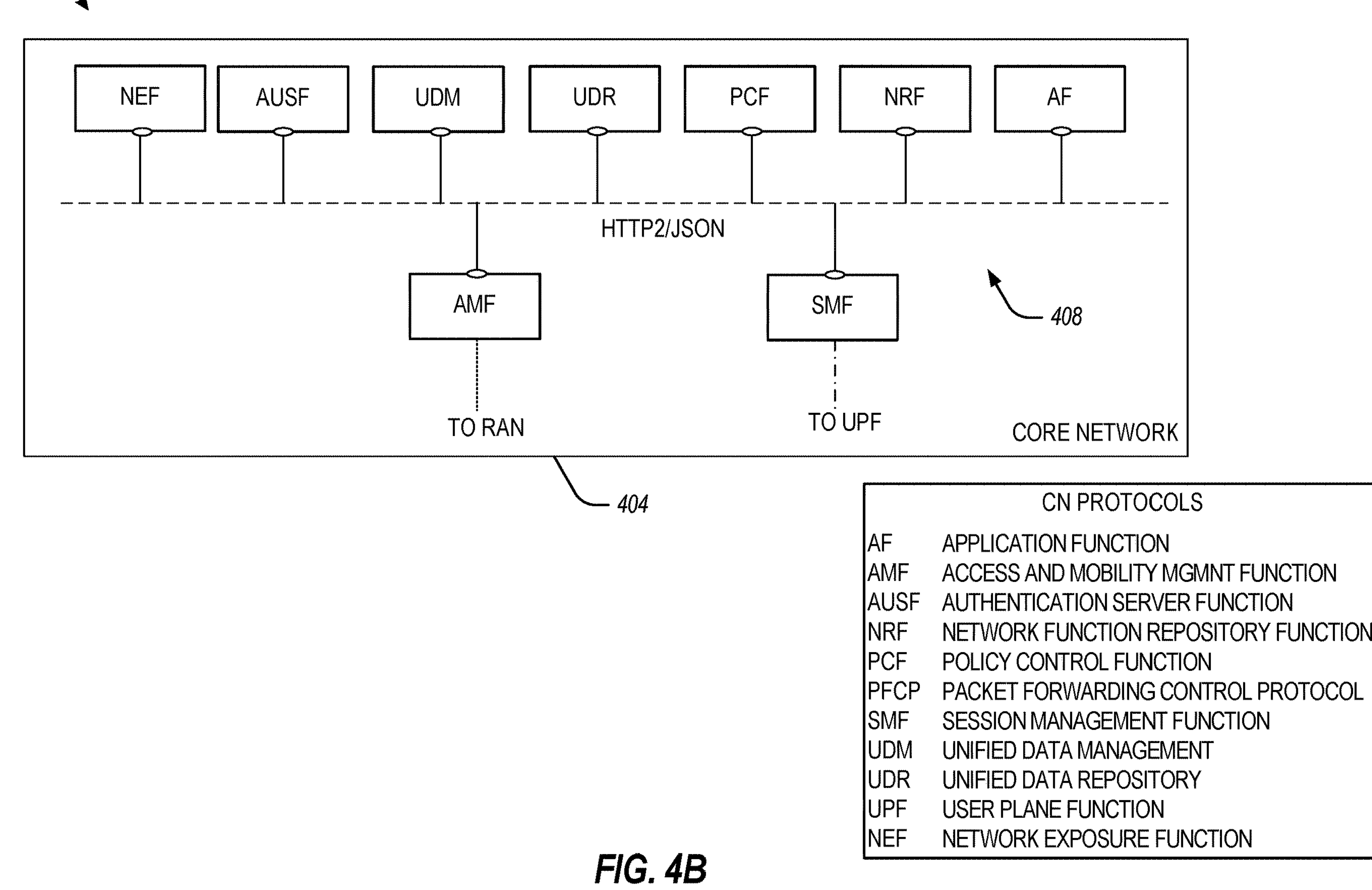
FIG. 4B depicts the application programming interface (API)-level representation of a 5G CN, according to an example.

FIG. 4B depicts diagram 401 of the application programming interface (API)-level representation of CN 404, according to an example. Referring to FIG. 4B, there is illustrated another view of the CN functions 408 which can be used in connection with disclosed techniques.

In some aspects, the serving UPF and related EAS (MEC app) can be subjected to mobility. In some aspects associated with the example deployments described herein, where endpoints of edge apps and platforms are outside the PLMN domain, the disclosed techniques can be considered in connection with RAN and edge mobility aspects.

Figure 5:
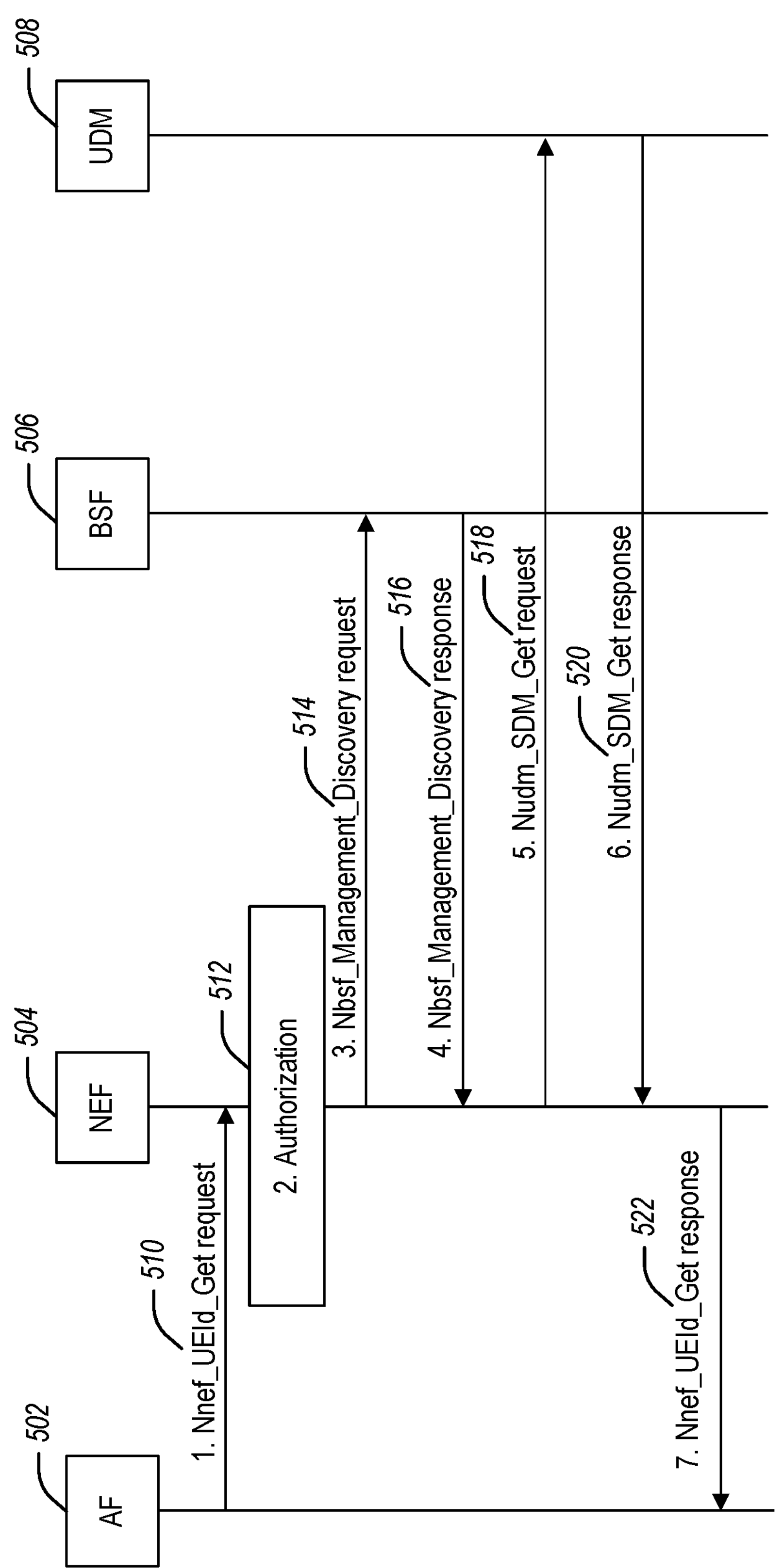
FIG. 5 depicts a communication exchange for application function (AF)-specific UE ID retrieval, according to an example.
Figure 6:
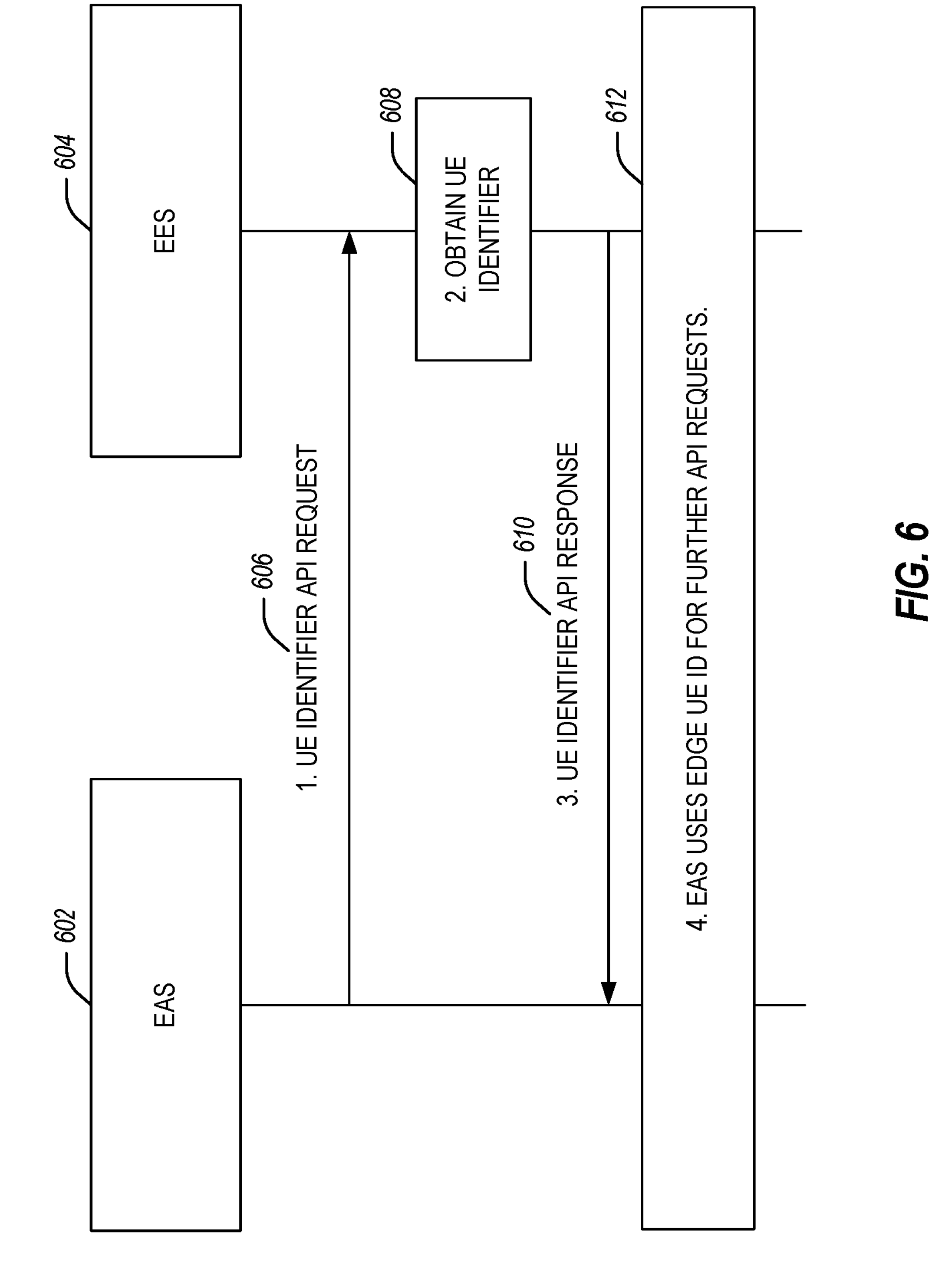
FIG. 6 depicts a communication exchange for UE ID retrieval by an edge application server (EAS) using a UE identifier API, according to an example.

In some aspects, the targeted use cases associated with FIG. 5 and FIG. 6 illustrate the importance of mapping between the UE ID and the UE IP address.

In the discussed communication environments, there are scenarios where an AF (EAS/MEC app and any other edge application even outside the PLMN domain) may need the UE ID to provide various services such as location services and other UE-related information. In some aspects, UE ID can be obtained through NEF (e.g., as illustrated in FIG. 5).

FIG. 5 depicts a communication exchange 500 for application function (AF)-specific UE ID retrieval, according to an example. Referring to FIG. 5, the communication exchange 500 takes place among AF 502, NEF 504, binding support function (BSF) 506, and unified data management (UDM) function 508.

At operation 510, AF 502 communicates a Nnef_UEId_Get request to NEF 504 to request the UE ID. At operation 512, NEF 504 performs authorization of the request. At operation 514, NEF communicates a management discovery request to BSF 506. At operation 516, BSF 506 communicates a management discovery response to NEF 504. At operation 518, NEF 504 communicates a subscriber data management (SDM) request to the UDM function 508. At operation 520, the UDM function 508 communicates an SDM response to the NEF 504. At operation 522, NEF 504 communicates the UE ID response (with the UE ID) back to AF 502.

In some aspects, an AF may need to obtain the UE identifier (UE ID) based on the UE IP address. In this case, the AF uses the procedure described above concerning FIG. 5 to obtain the UE ID through NEF. Once the UE ID is obtained, the AF uses the UE ID (e.g., GPSI) later to issue UE-specific requests. However, the procedure in FIG. 5 may not work in cases when the network address translated (NATed) UE IP address is provided by the AF to NEF.

In some aspects, the EES exposes UE identifier APIs to provide a unique identifier named "Edge UE ID" for a UE (e.g., as illustrated in FIG. 6). This API can be used by the EAS to obtain the Edge UE ID, which the EAS can use to invoke UE-specific APIs on the EDGE-3 interface. The exact nature of such Edge UE ID and how EES knows about this Edge UE ID are not well defined in the technical specifications.

FIG. 6 depicts a communication exchange 600 for UE ID retrieval by an edge application server (EAS) using a UE identifier API, according to an example. Referring to FIG. 6, the communication exchange 600 takes place between EAS 602 and EES 604 (which can be configured at separate computing nodes or the same computing node). At operation 606, EAS 602 communicates a UE ID API request to EES 604. At operation 608, EES 604 obtains the UE identifier. At operation 610, EES 604 communicates a UE identifier API response to EAS 602. At operation 612, EAS uses the received edge UE ID for additional API requests (e.g., in connection with services provided to the UE).

In some embodiments, the UE ID and the edge UE ID mentioned above can be the same. In some aspects, the EES can maintain a mapping for the UE ID and the edge UE ID. In some embodiments, the UE ID (e.g., GPSI) obtained through the procedure described in FIG. 5 can be used for invoking UE-specific APIs by the EAS and the EES.

Figure 7:
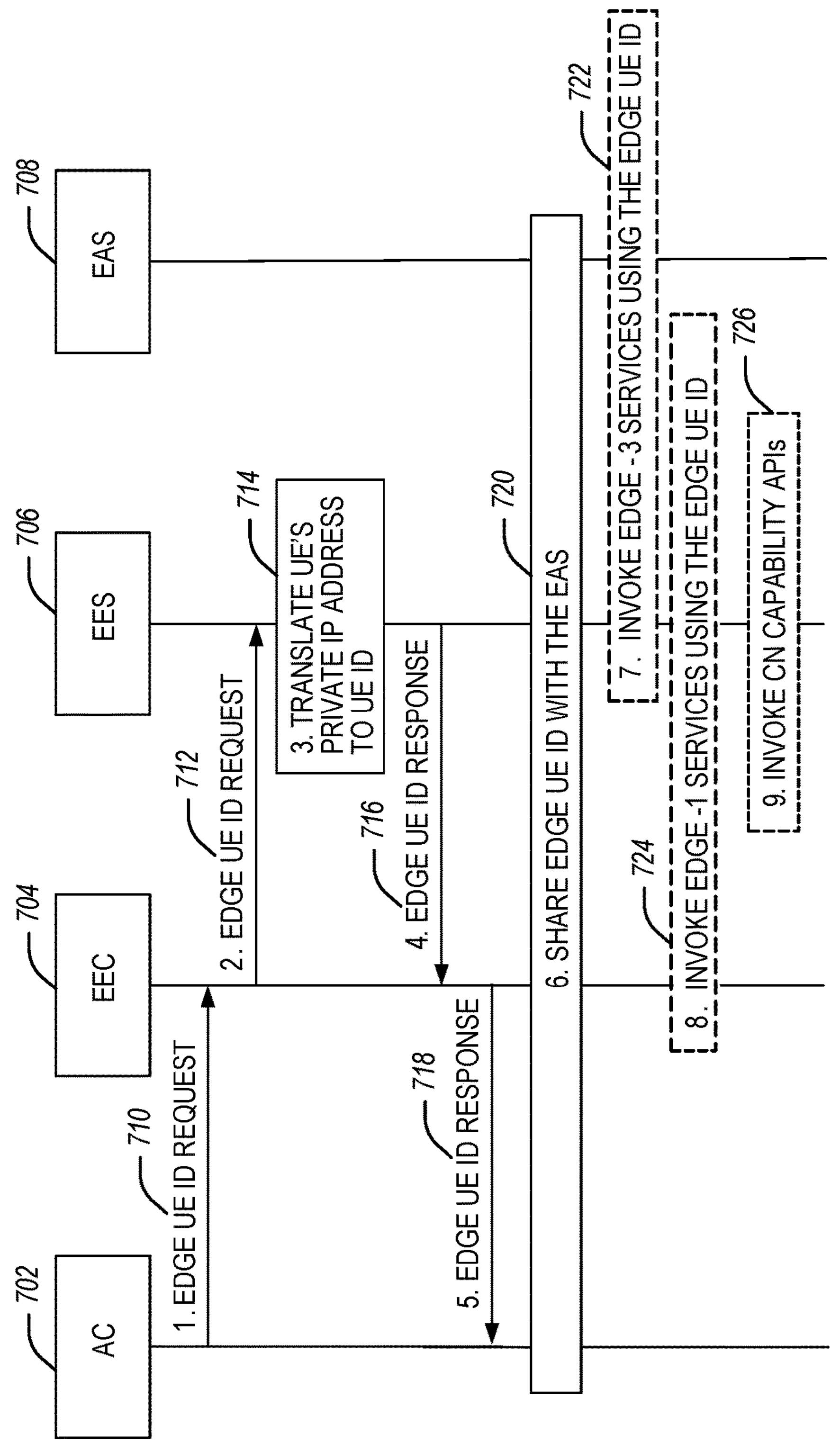
FIG. 7 depicts a communication exchange for UE ID retrieval by an application client (AC) in communication with an edge enabler client (EEC) of a UE, according to an example.

FIG. 7 depicts a communication exchange 700 for UE ID retrieval by an application client (AC) in communication with an edge enabler client (EEC) of a UE, according to an example. Referring to FIG. 7, the communication exchange 700 takes place between AC 702, EEC 704, EES 706, and EAS 708.

At operation 710, AC 702 communicates an edge UE ID request to EEC 704. At operation 712, EEC 704 communicates the edge UE ID request to EES 706. At operation 714, EES 706 translates the UE's private IP address to a UE ID. At operation 716, EES 706 communicates an edge UE ID response to EEC 704. At operation 718, EEC 704 communicates an edge UE ID response with the edge UE ID to AC 702. At operation 720, AC 702 shares the edge UE ID with EAS 708. At operation 722, EAS 708 invokes edge-3-based services using the edge UE ID. At operation 724, EES 706 invokes edge-1-based services using the edge UE ID. At operation 726, EES 706 can invoke CN capability APIs.

In some aspects associated with the above-discussed scenarios, to enable UE information consumption from the application level (i.e., AFs either implemented as EAS or MEC app), the 5GC needs to maintain a mapping between the IP address allocated to the UE and the UE ID.

Currently, there is no defined mechanism available in technical specifications for a 3GPP-based network to maintain and update this mapping of the UE IP address (or addresses) to the UE ID in case of UE mobility or change in the assigned IP address to the UE, or UE mobility from a NATed network to non NATed or IPv6 based network.

In some aspects, the NEF can be configured to maintain such mapping so that on request, the AF or EAS/EES can get the updated UE ID and also the UE ID can be resolved back to the right UE IP address, especially in case of NATed IP addresses.

A dual phenomenon also exists in the edge data network in case of a change in the IP address of the EAS. Currently, the EEC can subscribe to the EAS endpoint updates (e.g., Table 8.5.3.4-2 of 3GPP TS 23.558). In some aspects, the EAS registration update can be triggered in case of the EAS's status or availability schedule has changed, or the EAS's registration is about to expire. The registration update API can allow the updates in the EAS profile to be communicated. However, its impact on the session between AC and EAS is not defined currently.

In some aspects, the disclosed techniques can be used to introduce enablers in 5G systems and define proper messages among entities, exchanged via NEF and also enabling information exposure outside the PLMN domain. These enablers can be also standardized in ETSI MEC, for proper exposure at the MEC app level (e.g., via a tagging mechanism, to address security and privacy issues). In the case of 5G and ETSI MEC-compliant products, the disclosed techniques may be included respectively by 5G and MEC reference implementations of these products.

The disclosed techniques are not only describing the implementation of the involved entities, but also a proper communication protocol including messages among NEF and other functions, possibly also external to the PLMN domain. As a consequence, since the messages are targeting standardization in 3GPP and ETSI MEC, products implementing these systems can use the disclosed signaling.

Figure 8:
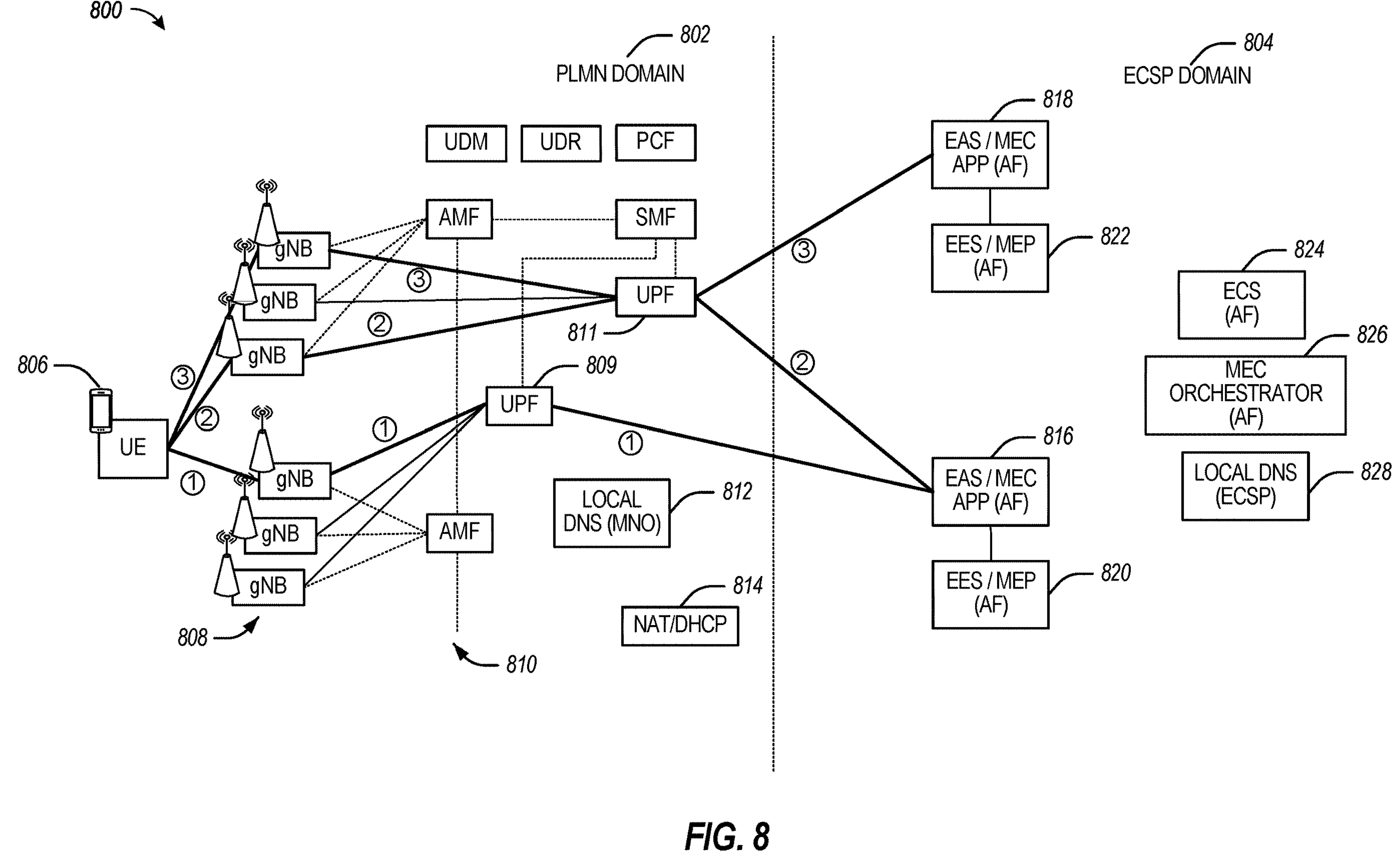
FIG. 8 depicts communications between a public land mobile network (PLMN) domain and an edge compute service provider (ECSP) domain in connection with UE mobility associated with radio handover (e.g., path #2) and MEC handover (e.g., path #3), according to an example.

FIG. 8 depicts an architecture 800 with communications between a public land mobile network (PLMN) domain 802 and an edge compute service provider (ECSP) domain 804 in connection with UE mobility associated with radio handover (e.g., path #2) and MEC handover (e.g., path #3), according to an example. Referring to FIG. 8, UE 806 is in communication with at least one base station of the plurality of base stations 808 in the PLMN domain 802. The plurality of base stations 808 can use a plurality of CN functions 810 of a CN of the PLMN domain 802 (e.g., UPF 809 and UPF 811). The PLMN domain 802 also includes a local DNS 812 (which can be configured by a mobile network operator or MNO) and a NAT/Dynamic host configuration protocol (DHCP) server 814.

The ECSP domain 804 includes the following functions or servers which can be reached via one or more application functions (Afs) from the PLMN domain 802: EAS/MEC app 816 and 818, EES/MEP 820 and 822, ECS 824, MEC orchestrator 826, and a local DNS server 828.

The reference scenarios affected by the present disclosure can include an edge computing deployment in a 5G system, where the edge application endpoints and platforms can reside also outside the 3GPP domain, and where both UEs and applications (either EAS or MEC apps) are characterized by mobility, and thus subjected to IP address changes.

FIG. 8 shows a UE moving from time #1 to #2 and from #2 to #3 (indicated by lines referenced as circled numbers 1, 2, and 3 in FIG. 8), respectively implying radio handover (i.e., between gNBs) and inter-MEC handover. In these cases, the Session Management Function (SMF) is managing the session context with the User Plane Function (UPF). Also, the edge applications are outside the PLMN domain, while inside the PLMN domain, a NAT/DHCP is filtering IP addresses. In some aspects, local DNS entities are also configured and used in both domains (as illustrated in FIG. 8) even if there are cases where these elements are not present.

In the disclosed scenarios, authorized applications may need to consume UE-related information (e.g., UE ID, UE IP address, or an obscured version of it). The capability exposure for enabling edge applications is illustrated in FIG. 9.

Figure 9:
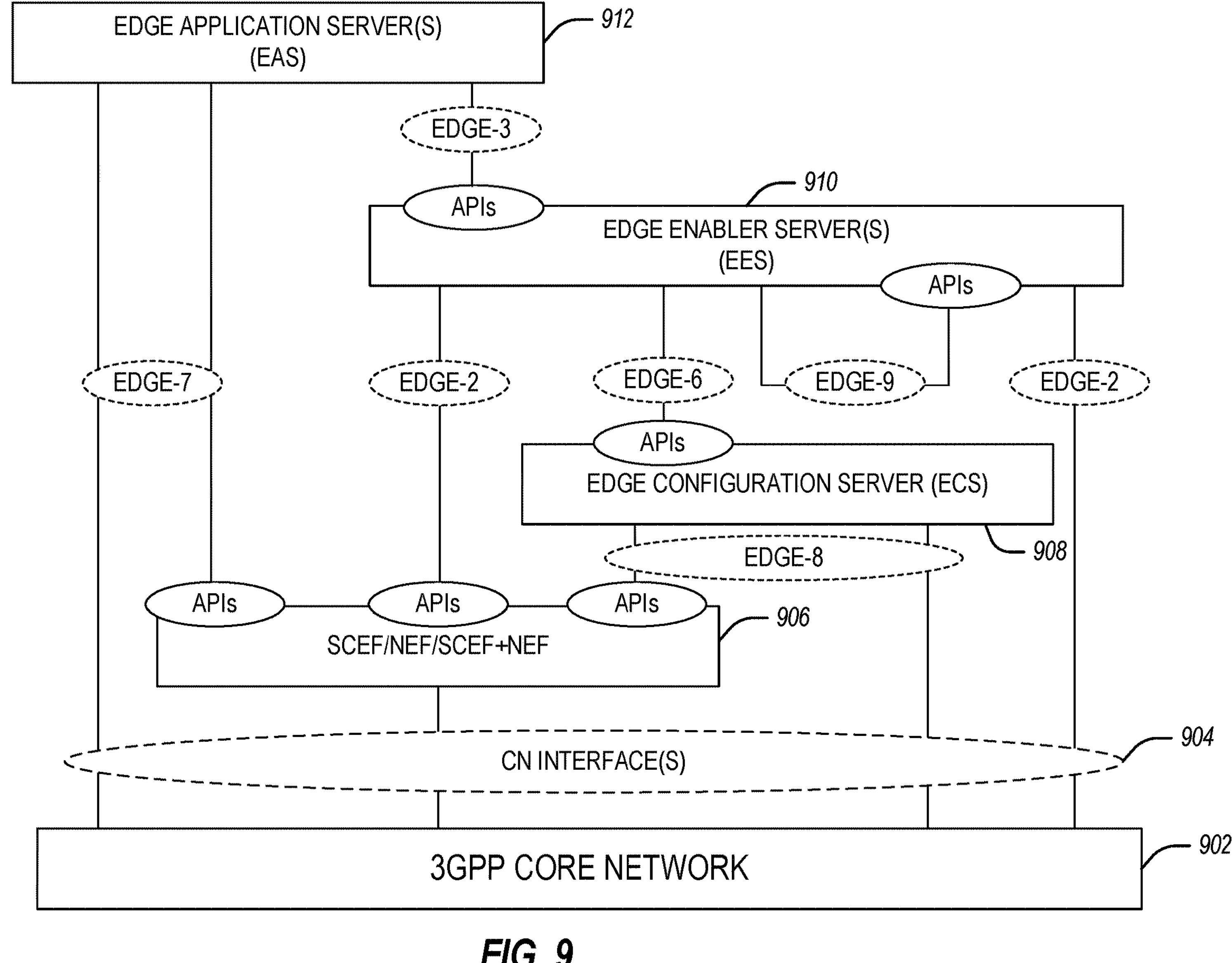
FIG. 9 depicts capability exposure for enabling edge applications, according to an example.

FIG. 9 is a diagram 900 depicting capability exposure for enabling edge applications, according to an example. Referring to FIG. 9, CN 902 uses CN interfaces 904 as well as SCEF/NEF APIs 906 to communicate with ECS 908, EES 910, and EAS 912.

Table 1 below shows some examples of UE-related APIs provided by the EES and exposed to EAS. However, in practical cases, this information can be linked to the up-to-date UE configurations.

TABLE 1

| API Name | Known Consumers | References from 3GPP TS 23.558 |
|---|---|---|
| Eees_UELocation | EAS | Clause 8.6.2 |
| Eees_AppClientInformation | EAS | Clause 8.6.4 |
| Eees_UEIdentifier | EAS | Clause 8.6.5 |

The disclosed techniques include a NEF upgrade to maintain the IP address bindings and allocations to be exposed to AF in case of UE mobility with NAT enabled. NEF configurations in connection with the disclosed techniques are provided below.

NEF Upgrade for NATed IP Identification

The following description relates to the NEF upgrade used for handling deployments with NATed IPs. When a NAT is deployed, the EEC knows the private IP assigned by the 5G Network (e.g., using the SMF), and the EAS knows the public IP address (e.g., NATed IP) which is translated from the private IP address.

In some aspects, either the EEC (on the UE side) or the EAS (on the edge network side) can invoke a "get UE identification" API and interact with the EES to get the UE ID information. The EES will then interact with the NEF via a CN capability exposer API.

In some aspects, the "get UE identification" APIs from the NEF can fail in case the UE IP Address is NATed IP because the NEF does not maintain any information about the type of IP address (whether NATed or private).

The disclosed techniques introduce an upgraded NEF that maintains map information for the UE IP address(es) and the UE identifier. More specifically, the NEF uses 3-tuple values—private IP address, public IP address (NATed IP), and UE ID. In aspects when port-based NAT is used, port information is also needed (and can be included) as part of the tuple values. This configuration also allows the AFs to query based on any type (Private IP or Public/NATed) IP address.

In some aspects, the NEF provides a unified API (e.g., Nnef_UEId_Getrequest) to handle requests from the EES. The EES can be aware of whether the request is from the EEC or the EAS. Then the EES can use the information as an input parameter when invoking the unified API (e.g., Nnef_UEId_Getrequest).

Figure 10:
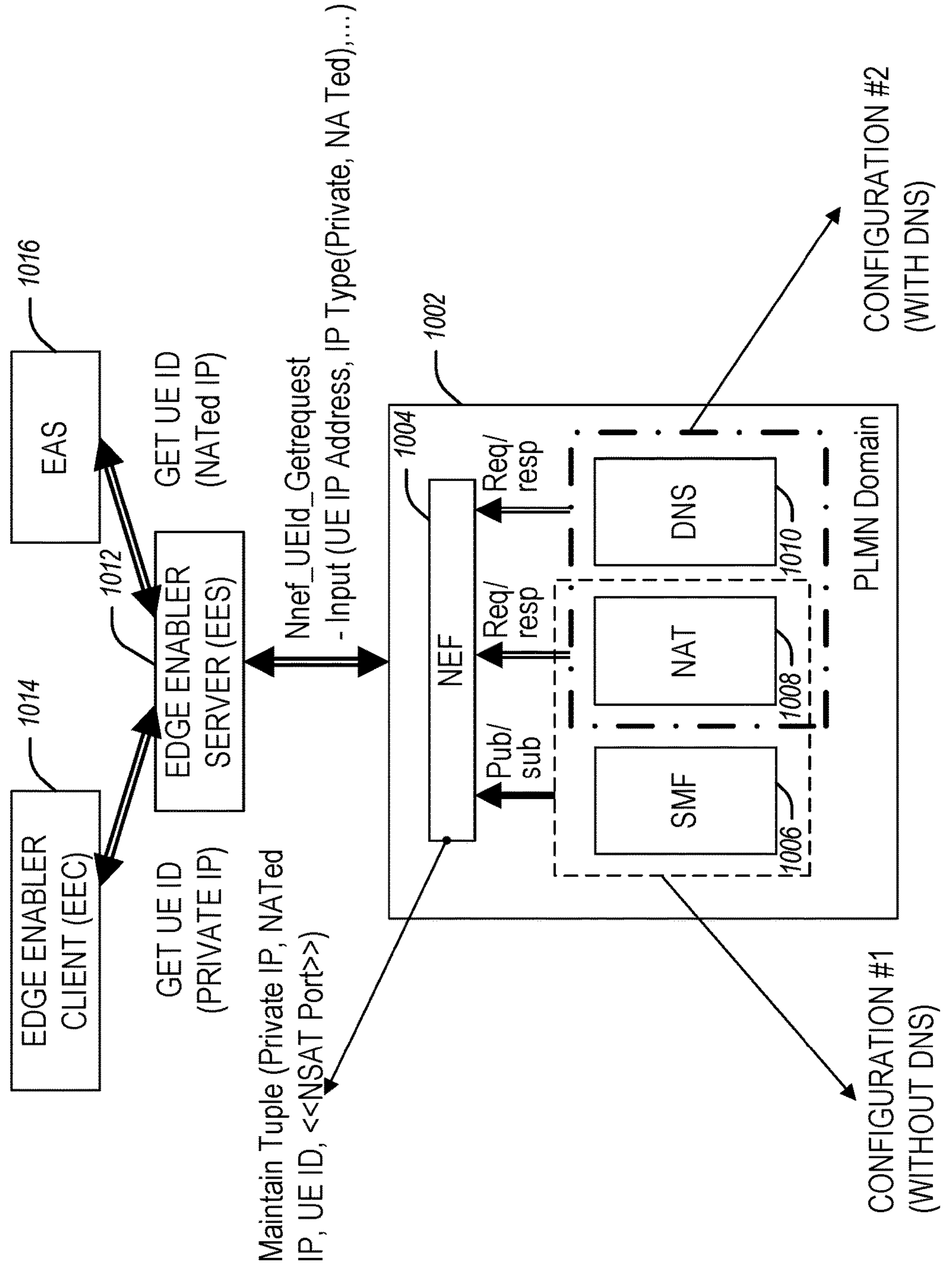
FIG. 10 depicts network exposure function (NEF) interactions for resolving a network address translation (NAT) IP address with and without domain name system (DNS) function, according to an example.

Since SMF, DNS, and NAT are all the network functions that are deployed and controlled by MNO, NEF can extend the capability to interact with them and create 3-tuple information as mentioned above. FIG. 10 illustrates the example interactions associated with the disclosed techniques.

FIG. 10 depicts network exposure function (NEF) interactions for resolving a network address translation (NAT) IP address with and without a domain name system (DNS) function, according to an example. Referring to FIG. 10, diagram 1000 illustrates a PLMN domain 1002 including NEF 1004 in communication with SMF 1006, NAT 1008 (e.g., a NAT server or NAT function), and DNS 1010 (e.g., a DNS server or a DNS function). The PLMN domain 1002 (and NEF 1004) is in communication with EES 1012, EEC 1014, and EAS 1016.

In some aspects, DNS 1010 depicted in FIG. 10 can be configured as a local DNS, while there are also other possible implementations (e.g., hierarchical ones), where there can be additional DNS servers outside the PLMN domain 1002. All illustrated servers and functions in FIG. 10 are in communication with the NEF 1004, as described further in Configuration #1 and #2 below.

With the NEF configurations based on the disclosed techniques, the following two configurations can be used:

(a) Configuration #1 (NEF configuration without using a DNS). In some aspects, NEF 1004 subscribes to SMF 1006 for UE IP address change and obtains the additional IP information from the NAT server (e.g., NAT 1008).

(b) Configuration #2 (NEF configuration with using a DNS). In some aspects, NEF 1004 obtains the UE IP address information from the DNS server (e.g., DNS 1010).

Configuration #1 (Without Using a DNS)

In some aspects, NEF 1004 subscribes to SMF 1006 to receive updates/notifications on UE mobility events. According to the first configuration, NEF 1004 can keep this binding up to date by exploiting the 5GC. More specifically, NEF 1004 can exploit the pub-sub mechanism, so that the NEF 1004 can subscribe toward the SMF 1006 for any UE mobility events. In some aspects, once the registration procedure is finalized, the UE is served by an appropriate SMF. The SMF 1006 will then provide UE-related notifications concerning mobility and report them to NF consumers such as PCF or NEF (e.g., NEF 1004).

In some aspects, SMF 1006 can be configured to manage the UE IP address and act as a DHCP. More specifically, the SMF can perform the role of a DHCP server and an IP Address Management (IPAM) system. Together with the UPF, the SMF 1006 can maintain a record of the PDU session state using a 24-bit PDU Session ID. In some aspects, the SMF 1006 can set configuration parameters in the UPF that define traffic steering parameters and ensure the appropriate routing of packets while guaranteeing the delivery of incoming packets, though a downlink (DL) data notification.

Since the SMF 1006 will be aware of any IP changes (e.g., given also by UPF changes), the NEF 1004 can subscribe toward the SMF 1006, and the SMF 1006 can notify the NEF 1004 automatically when this IP mapping has changed. At this point, the AF (e.g., EES/MEP) can send a request to obtain the new IP address. In some aspects, this information can be obscured so that a tag is provided in place of the IP address (e.g., for security and privacy reasons).

In some aspects, NEF 1004 subscribes to SMF 1006 for UE IP address change events, however, it only obtains the private IP address (non-NATed (public) IP address) of the UE as maintained by the SMF along with the UE ID (e.g., GPSI). Since the AF will request from the NEF 1004 the NATed IP address of the UE, the "get UE ID API" operation will fail. Hence, In some embodiments, the NEF procedure can be updated to obtain the NATed IP address as well from the NAT server (e.g., NAT 1008), and NEF 1004 can maintain the combination of (Private IP address, NATed (e.g., public) IP address, UE ID, NAT Port (if available)). In some aspects, NAT Port is captured when a port-based NAT is used. In some aspects, NEF 1004 can subscribe to SMF 1006 for UE IP address change events.

In the event of a change in the UE IP address change due to UE mobility, SMF 1006 notifies NEF 1004 through a notification event (e.g., using the Nsmf_EventExposure_Notify service operation). In some aspects, this notification procedure can be modified as illustrated in FIG. 11.

Figure 11:
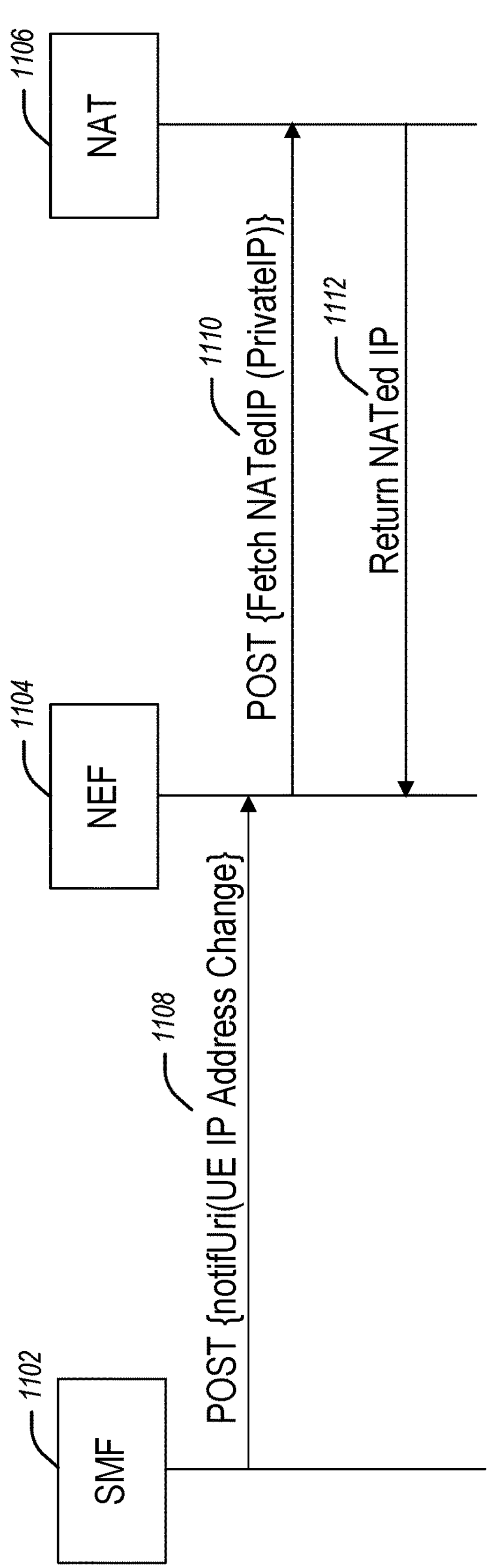
FIG. 11 depicts a communication exchange associated with an updated notification procedure for UE IP address change, according to an example.

FIG. 11 depicts a communication exchange 1100 associated with an updated notification procedure for UE IP address change, according to an example. Referring to FIG. 11, the communication exchange 1100 takes place between SMF 1102, NEF 1104, and NAT 1106 (which can be the same as SMF 1006, NEF 1004, and NAT 1008, respectively).

At operation 1108, SMF 1102 sends a notification of UE IP address change (e.g., due to mobility) to NEF 1104. At operation 1110, after the NEF 1104 receives the notification, the NEF 1104 queries the NAT 1106 to obtain (at operation 1112) the new NATed IP address of the UE and maintains the tuple (Private IP address, NATed IP address, UE ID (e.g., GPSI)) associated with the UE. In case a port-based NAT is used, the tuple also includes the NAT Port so that the tuple maintained by the NEF is (Private IP address, NATed IP address, UE ID (e.g., GPSI), <NAT Port>).

In some aspects, AF uses the Nnef_UEId_Get request to get the UE ID based on the IP address. If the AF provides a NATed IP address, the existing NEF procedure fails because SMF does not provide the NATed IP details to the NEF. However, the NEF configured with the modified procedure discussed above does have the NATed IP address also maintained, and hence can successfully return the UE ID (e.g., GPSI) to the AF. In some aspects, NEF 1004 is aware of what kind (Public or Private) of IP address has been passed by the AF.

Configuration #2 (With Using a DNS)

In some aspects, NEF 1004 updates directly from the DNS 1010. In some edge computing solutions, the following options are possible to manage IP addresses resolutions coming from UE traffic requests to reach out to edge applications:

(a) Use an additional DNS resolver. SMF 1006 passes it to UE as the first hop DNS resolver. It can be a local DNS resolver or a new DNS AF within 5GC. This new DNS resolver carries edge service information from applications. Combined with the 5GC UE location info, the DNS resolver can direct UE to the optimal edge service.

(b) Expose UE location information to an application authoritative resolver via local UPF information. It can be a local NAT subnet or configured locally.

(c) Leverage DNS resolvers within EAS 1016. EAS 1016 can be located either via UE Route Selection Policy (URSP) or AF influencing (e.g., using traffic descriptors). In some aspects, an optimal SMF can be selected to anchor a UPF with targeted EAS deployed. The target EAS uses the DNS resolver to resolve a UE request.

In some aspects, the usage of (local, central, or hierarchical) DNS server for user plane traffic can be suitable for the UE to obtain an edge application IP address. In some aspects, 3GPP and ETSI MEC APIs and reference architecture can be adopted to support EAS and DNS resolvers. In some aspects, DNS resolvers can be updated by UE locations or application edge service availability.

In some aspects, the DNS server (e.g., DNS 1010) maintains the edge servers side application FQDN and IP address, as well as additional information regarding the edge server such as locations. However, DNS servers do not intend to maintain UE IP addresses after the Time-To-Live (TTL) expiration. In typical cases without mobility, a solid long TTL is around 1 hour (3600 seconds), and a short TTL of 5 minutes (300 seconds). However, when considering UE mobility (radio and MEC) a more frequent change in IP address would be better associated with smaller values of TTL, which would also allow a faster DNS propagation, in case of multiple steps until the authoritative DNS server.

In some aspects, DNS records are updated and refreshed after receiving proper commands, e.g., DNS query from the UE. For example:

(a) DNS query #1: UE IP x.x.x.x EdgeApp FQDN: example.com, query time: 2022/05/03/; and (b) DNS query #2: UE IP y.y.y.y EdgeAPP FQDN: intel.com, query time: 2022/05/04.

In some aspects, the usage of DNS can be suitable for getting updated EAS information from the UE side. Also, DNS records and tables can be reverted, to get the UE-related information, that can be consumed from the EAS side.

This will come with the advantage to have a unique mapping point for this information. In addition, the DNS also can implement suitable firewalling techniques that would prevent DDoS attacks on edge computing infrastructures, thus with greater benefits in terms of security and privacy. However, to properly implement this DNS-based solution in practical cases, the following can be considered:

(a) a proper TTL can be set in DNS servers, especially when multiple steps toward the DNS authoritative server are foreseen, to facilitate DNS propagation;

(b) when considering the local DNS within the PLMN domain (e.g., seen as AF sitting in the 5GC), proper authorization (or filtering) of IP address sharing to other external DNS servers can be considered. In fact, for security and privacy concerns, the MNO may not authorize to share the UE IP address, but an obscured version of it (e.g., via a proper tagging mechanism); and (c) a small limitation of this approach is when the UE is becoming idle, and then not sending any query after the TTL expiration (this may also happen when the TTL is not properly set, e.g., not taking into account the actual level of UE activity). In these cases, the DNS may lose the binding and would not be able to track the UE IP address. However, in these cases, it is simply needed to wait for the next UE activity that will trigger the creation of new DNS records. This will imply a small latency, that will essentially depend on the number of hops needed for the DNS propagation.

An example of implementation is described in the following paragraphs.

In some aspects, a trusted DNS AF within a 5GC is envisaged which is passed as the first hop nameserver to the UE. Thus, when the UE AC requests DNS resolution of the MEC app/EAS, the request passes through this resolver. It may be part of a hierarchy and forward the request to a more authoritative resolver in the hierarchy. However, it records the UE IP address, which in this case will be the UE private IP address. The NAT is done only when the packet is forwarded on N6 (e.g., the EAS will see the public address). Upon this initial DNS record creation, the DNS AF obtains the UE ID from SMF and gathers the NAT translation (dynamic translation rule or actual mapping from the NAT server) for the UE private IP.

Thus, the DNS AF has the tuples corresponding to: [UE Private IP, UE Public IP, UE ID]. The DNS AF can either implement (a) reverse DNS lookup or (b) publish to NEF for the UE IP resolution as described further.

(a) Using Reverse Lookup.

The DNS AF further creates a reverse DNS lookup record (e.g., a PTR record) such that the EAS/MEC app can query the IP address it received. The address may be the UE private IP address or the UE public IP address. The PTR record may be described as follows, for an example UE IP address of a.b.c.d:

d.c.b.a.in-addr.arpa IN PTR "UE ID".local_domain (Note: the record will indicate a mapping to the UE ID in the local domain).

Alternatively, a TXT domain can be included which the EAS can query via the DNS system. In this case, the reverse DNS on the UE IP address will return the IP address as a string, which when queried for the TXT record will return the UE ID. More specifically, the PTR record may be:

d.c.b.a.in-addr.arpa IN PTR a_b_c_d.local_domain; and ab_c_d.local_domain TXT "UE ID".

(b) Using NEF.

In some embodiments, the DNS AF publishes any changes or completion of the tuple [UE Private IP, UE Public IP, UE ID] and this kind of event is made available to the NEF, for possible external subscriptions to these notifications (e.g., for any requests on UE location or context services from the EAS). The disclosed techniques can include a configuration where the DNS AF communicates the tuple information to NEF. One of the ways to achieve the same is to use a UE Mobility Event that can be subscribed to by the NEF.

In some aspects, the DNS AF can be configured to perform the following functions: act as a passthrough or forwarding agent concerning DNS functions, intercept and keep the UE ID-to-IP mappings, keeps reverse DNS PTR records based on the UE IP (NATted or Private) address, and publish changes to the NEF.

In some aspects, the DNS will own and keep updated a lookup table containing a list of rows with the following tuple: [UE Private IP address, UE Public IP address, UE ID].

In some aspects, the number of rows if this table corresponds to the UEs managed by that specific local DNS server. Hierarchical implementations of DNS servers can be used to serve bigger and more complex deployments, where a higher-level DNS server may collect a super-set of records, i.e., including all UEs served. For the sake of simplicity, this complex case is not described in the present disclosure, but such implementation is not prevented based on the examples and techniques discussed herein.

Table 2 below provides examples of mapping between a UE ID, a private IP address, and a public IP address.

TABLE 2

| UE ID | UE private IP | UE public IP Address |
|---|---|---|
| 12345678@domain.com | 192.168.0.23 | 10.9.1.67/123 |
| 23232424@domain.com | 192.168.0.24 | 10.9.1.67/124 |
| 46574758@domain.com | 192.168.0.25 | 10.9.1.67/125 |

Another aspect of address resolution is when the IPAM is external to the 5GC (e.g. when external DHCPv4/v6 is used). However, this configuration may be subverted by ensuring SMF returns the local DNS AF as the DNS server and programs the DNS AF to forward to the DNS the DHCPv4 specified. This is not difficult as the SMF is initially informed to forward the DHCP packets to the external entity.

In some aspects, even if it was not the case one could program rules in UPF to forward UE DNS requests internally to the DNS AF, which would then forward them. In this scenario, the EAS/MEC app queries the NEF for the UE context utilizing the UE address which may be NATed. The NEF responds with the UE ID as received from the DNS AF.

As mentioned earlier, security and privacy issues may require not directly exposing the UE information, but some proper tags that are representing obscured versions of that information. In some aspects, each UE ID may have an associated UE ID Tag. In addition, for a certain UE, there can be multiple IP addresses related to various PDU sessions. Hence, multiple tags can be needed, to permit the association of a certain PDU session of a certain UE.

An example of a single UE is provided in Table 3 below.

TABLE 3

| UE#1 ID | 123456789@domain.com | Tag_UE1_ID |
|---|---|---|
| PDU session#1 | IP addr#1 (local): 192.168.0.23 | Tag_UE1_IP1 |
| PDU session#2 | IP addr#2 (local): 192.168.0.8 | Tag_UE1_IP2 |
| PDU session#3 | IP addr#3 (local): 192.168.0.172 | Tag_UE1_IP3 |
| PDU session#4 | IP addr#4 (local): 192.168.0.35 | Tag_UE1_IP4 |

In this regard, the DNS will be able to own and manage a table with all these tags.

Table 4 below illustrates examples of UE tagging information (for translation from external consumers).

TABLE 4

| # | UE ID Tag | PDU session Tag List (array, e.g. in TLV format) |
|---|---|---|
| 1 | Tag_UE1_ID | [Tag_UE2_IP1, Tag_UE1_IP2, Tag_UE1_IP3] |
| 2 | Tag_UE2_ID | [Tag_UE2_IP1, Tag_UE2_IP2] |
| 3 | Tag_UE3_ID | [Tag_UE3_IP1, Tag_UE3_IP2, Tag_UE3_IP3, Tag_UE3_IP4] |

In some aspects, the tagging information can be owned and managed by the NEF. In that case, the information exchanges between the NAT and the NEF are "in clear", while the final consumer (e.g., EAS/MEC app) is accessing the tags via the NEF (which is managing the obscuration of that information).

In some aspects, as a final step, when the DNS records (and related reversed records) are updated, the NEF can subscribe to updates coming from directly the DNS and expose this information to authorized consumers (e.g., EASs or MEC apps even outside the PLMN domain). In some aspects, this final step of the second configuration can be the same as the corresponding step in the first configuration.

Implementation in Edge Computing Scenarios

It will be understood that the present techniques associated with MEC federation and OP operability may be integrated with many aspects of edge computing strategies and deployments. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Figure 12:
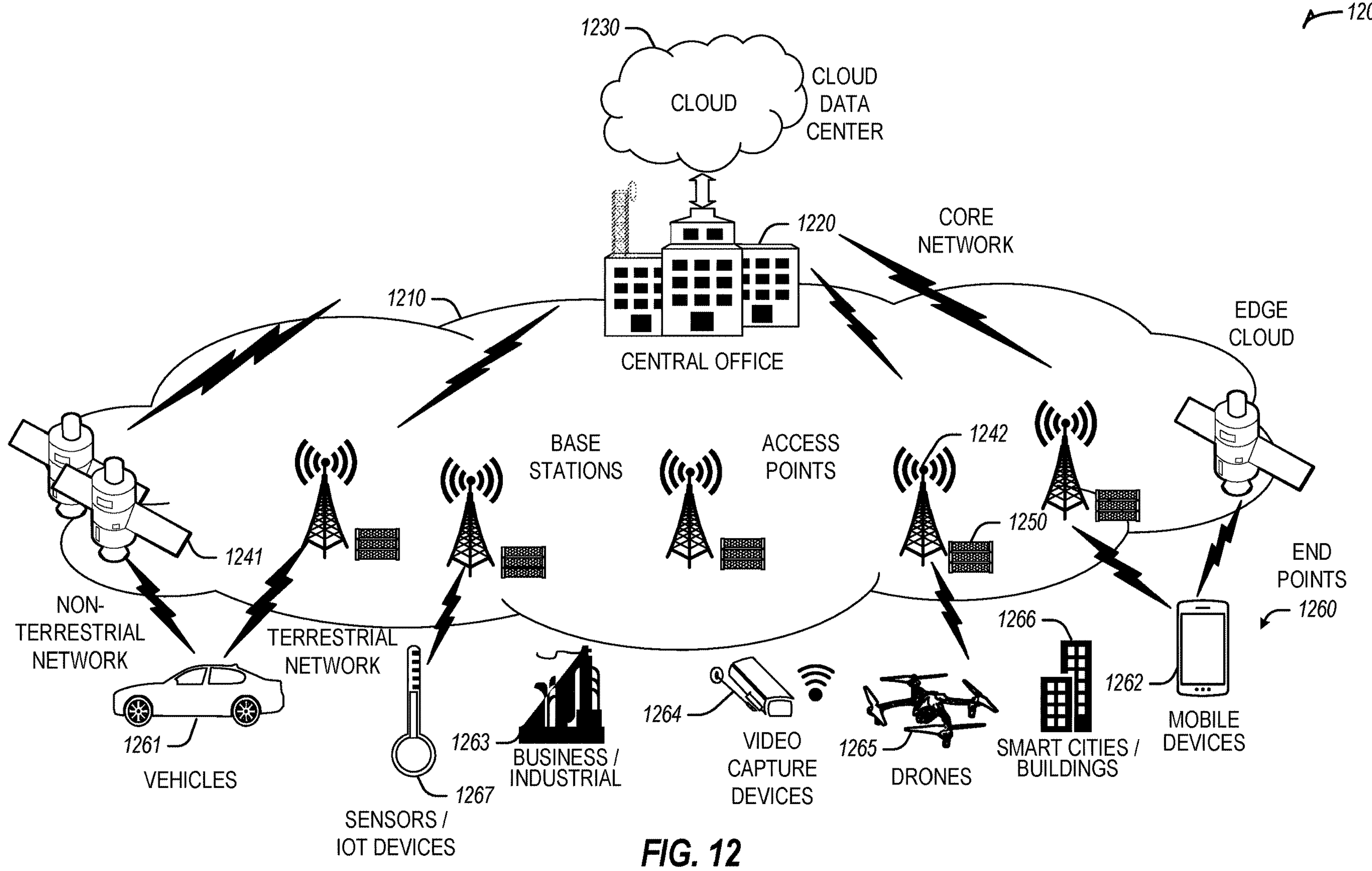
FIG. 12 illustrates an overview of an edge cloud configuration for edge computing, according to an example.

FIG. 12 is a block diagram 1200 showing an overview of a configuration for edge computing, which includes a layer of processing referenced in many of the current examples as an "edge cloud". This network topology, which may include several conventional networking layers (including those not shown herein), may be extended through the use of the satellite and non-terrestrial network communication arrangements discussed herein.

As shown, the edge cloud 1210 is co-located at an edge location, such as a satellite vehicle 1241, a base station 1242, a local processing hub 1250, or a central office 1220, and thus may include multiple entities, devices, and equipment instances. The edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities, and building devices 1266, sensors and IoT devices 1267, etc.) than the cloud data center 1230. Compute, memory, and storage resources which are offered at the edges in the edge cloud 1210 are critical to providing ultra-low or improved latency response times for services and functions used by the endpoint data sources 1260 as well as reducing network backhaul traffic from the edge cloud 1210 toward cloud data center 1230 thus improving energy consumption and overall network usages among other benefits.

Compute, memory, and storage are scarce resources, and generally decrease depending on the edge location (e.g., fewer processing resources are available at consumer endpoint devices than at a base station or a central office). However, the closer the edge location is to the endpoint (e.g., UEs), the more that space and power are constrained. Thus, edge computing, as a general design principle, attempts to minimize the number of resources needed for network services, through the distribution of more resources that are located closer both geographically and in-network access time. In the scenario of the non-terrestrial network, distance, and latency may be far from the satellite, but data processing may be better accomplished at edge computing hardware in the satellite vehicle rather than requiring additional data connections and network backhaul to and from the cloud.

In an example, an edge cloud architecture extends beyond typical deployment limitations to address restrictions that some network operators or service providers may have in their infrastructures. These include a variety of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to the endpoint devices producing and consuming the data. For example, edge gateway servers may be equipped with pools of memory and storage resources to perform computation in real-time for low latency use cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. Likewise, within edge computing deployments, there may be scenarios in services in which the compute resource will be "moved" to the data, as well as scenarios in which the data will be "moved" to the compute resource. Or as an example, a base station (or satellite vehicle) compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In contrast to the network architecture of FIG. 12, traditional endpoint (e.g., UE, vehicle-to-vehicle (V2V), vehicle-to-everything (V2X), etc.) applications are reliant on local devices or remote cloud data storage and processing to exchange and coordinate information. A cloud data arrangement allows for long-term data collection and storage but is not optimal for highly time-varying data, such as a collision, traffic light change, etc., and may fail in attempting to meet latency challenges. The extension of satellite capabilities within an edge computing network provides even more possible permutations of managing compute, data, bandwidth, resources, service levels, and the like.

Depending on the real-time requirements in a communications context, a hierarchical structure of data processing and storage nodes may be defined in an edge computing deployment involving satellite connectivity. For example, such a deployment may include local ultra-low-latency processing, regional storage, and processing as well as remote cloud data-center-based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally to meet latency requirements. Higher layer data such as Application Layer data is typically less time-critical and may be stored and processed in a remote cloud data center.

Figure 13:
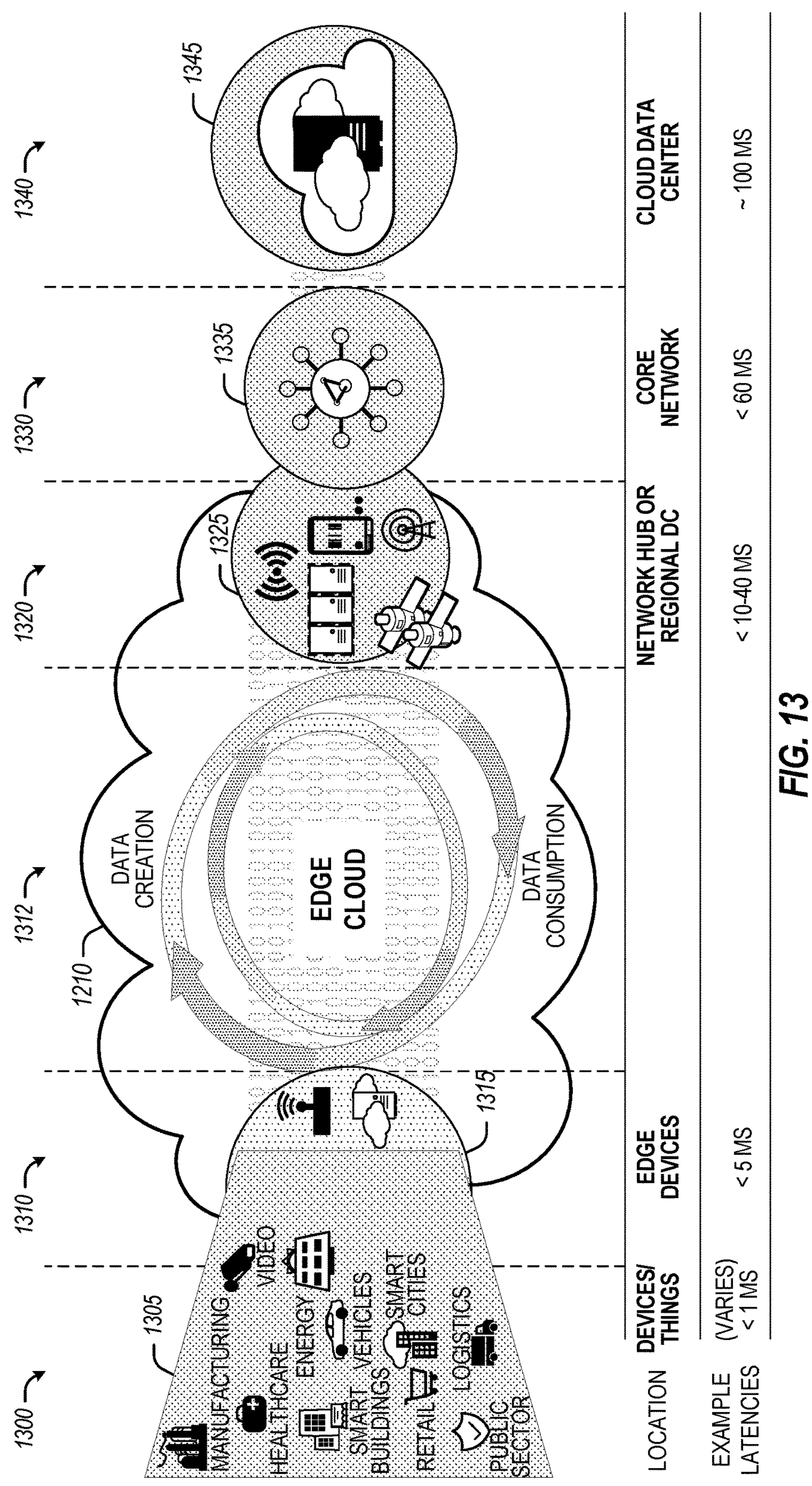
FIG. 13 illustrates an overview of layers of distributed compute deployed among an edge computing system, according to an example.

FIG. 13 illustrates operational layers among endpoints, an edge cloud, and cloud computing environments. Specifically, FIG. 13 depicts examples of computational use cases 1305, utilizing the edge cloud 1210 among multiple illustrative layers of network computing. The layers begin at an endpoint (devices and things) layer 1300, which accesses the edge cloud 1210 to conduct data creation, analysis, and data consumption activities. The edge cloud 1210 may span multiple network layers, such as an edge devices layer 1310 having gateways, on-premise servers, or network equipment (nodes 1315) located in physically proximate edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the edge cloud 1210 and among the various layers may occur via any number of wired or wireless mediums, including via connectivity architectures and technologies not depicted.

Examples of latency with terrestrial networks, resulting from network communication distance and processing time constraints, may range from less than a millisecond (ms) when among the endpoint layer 1300, under 5 ms at the edge devices layer 1310, to even between 10 to 40 ms when communicating with nodes at the network access layer 1320.

(Variation to these latencies is expected with the use of non-terrestrial networks). Beyond the edge cloud, 1210 are core network layer 1330 and cloud data center layer 1340, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values is provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1335 or a cloud data center 1345, a central office or content data network may be considered as being located within a "near edge" layer ("near" to the cloud, having high latency values when communicating with the devices and endpoints of the use cases 1305), whereas an access point, base station, on-premise server, or network gateway may be considered as located within a "far edge" layer ("far" from the cloud, having low latency values when communicating with the devices and endpoints of the use cases 1305). It will be understood that other categorizations of a particular network layer as constituting a "close", "local", "near", "middle", or "far" edge may be based on latency, distance, several network hops, or other measurable characteristics, as measured from a source in any of the network layers 1300-1340.

The various use cases 1305 may access resources under usage pressure from incoming streams, due to multiple services utilizing the edge cloud. To achieve results with low latency, the services executed within the edge cloud 1210 balance varying requirements in terms of (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business-level requirements. The services executed with the "terms" described may be managed at each layer in a way to assure real-time, and runtime contractual compliance for the transaction during the lifecycle of the service. When a component in the transaction is missing its agreed SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), etc.), which cannot leverage conventional cloud computing due to latency or other limitations. This is especially relevant for applications that require connection via satellite, and the additional latency that trips via satellite would require to the cloud.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g. when housed in a third-party location). Such issues are magnified in the edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1210 (network layers 1300-1340), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, circuitry, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1210.

As such, the edge cloud 1210 is formed from network components and functional features operated by and within edge gateway nodes, edge aggregation nodes, or other edge compute nodes among network layers 1310-1330. The edge cloud 1210 thus may be embodied as any type of network that provides edge computing and/or storage resources that are proximately located to a radio access network (RAN) capable endpoint devices (e.g., mobile computing devices, IoT devices, smart devices, etc.), which are discussed herein.

In other words, the edge cloud 1210 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1210 may be servers, multi-tenant servers, appliance computing devices, and/or any other type of computing device. For example, a node of the edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input device such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc.

Figure 16A:
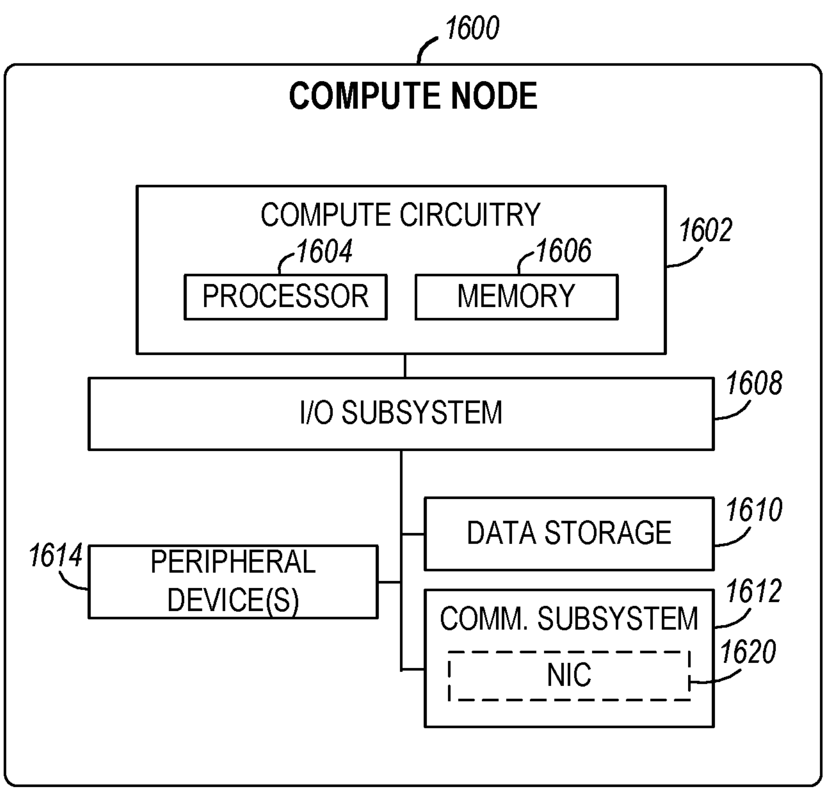
FIG. 16A illustrates an overview of example components deployed at a compute node system, according to an example.
Figure 16B:
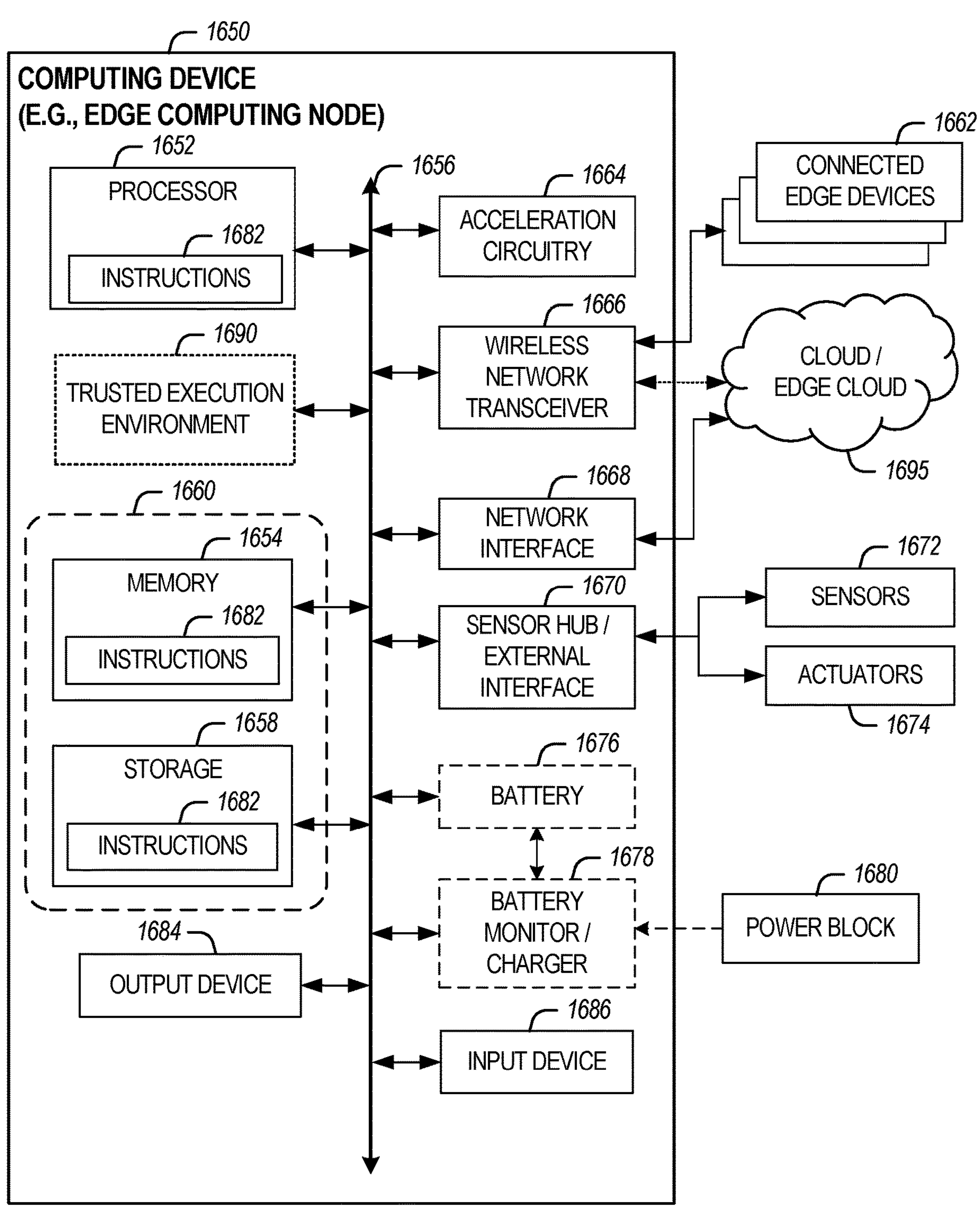
FIG. 16B illustrates a further overview of example components within a computing device, according to an example.

Example hardware for implementing an appliance computing device is described in conjunction with FIG. 16B. The edge cloud 1210 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 14:
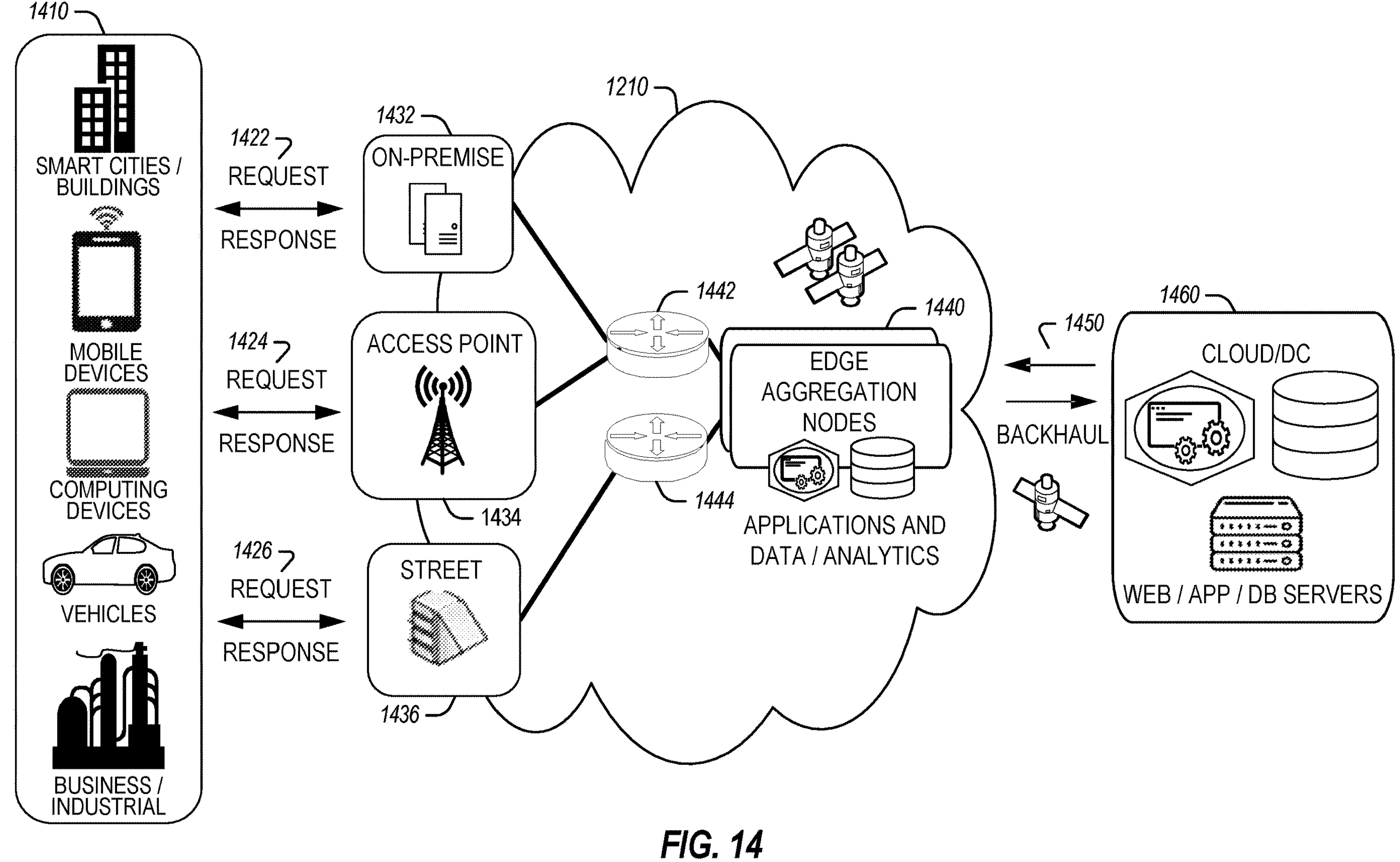
FIG. 14 illustrates operational layers among endpoints, an edge cloud, and cloud computing environments, according to an example.

In FIG. 14, various client endpoints 1410 (in the form of mobile devices, computers, autonomous vehicles, business computing equipment, and industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442 and 1444 within the edge cloud 1210 to aggregate traffic and requests. Thus, within the edge cloud 1210, the TSP may deploy various compute and storage resources, such as at edge aggregation nodes 1440 (including those located at satellite vehicles), to provide requested content. The edge aggregation nodes 1440 and other systems of the edge cloud 1210 are connected to a cloud or data center 1460, which uses a backhaul network 1450 (such as a satellite backhaul) to fulfill higher-latency requests from a cloud/data center for websites, applications, database servers, etc. Additional or consolidated instances of the edge aggregation nodes 1440 and the aggregation points 1442 and 1444, including those deployed on a single server framework, may also be present within the edge cloud 1210 or other areas of the TSP infrastructure.

At a more generic level, an edge computing system may be described to encompass any number of deployments operating in the edge cloud 1210, which provides coordination from the client and distributed computing devices. FIG. 13 provides a further abstracted overview of layers of distributed compute deployed among an edge computing environment for purposes of illustration.

Figure 15:
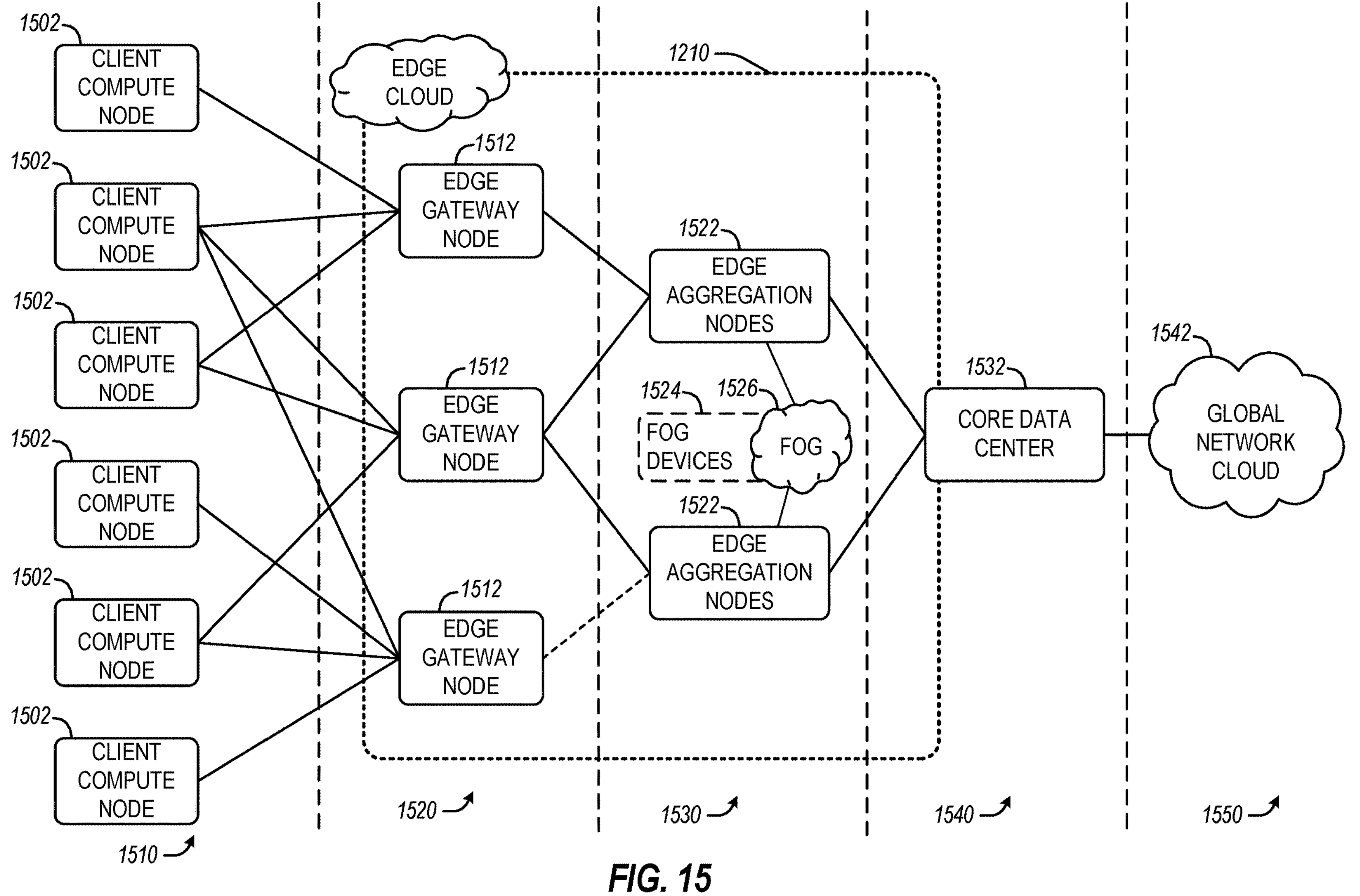
FIG. 15 illustrates an example approach for networking and services in an edge computing system, according to an example.

FIG. 15 generically depicts an edge computing system for providing edge services and applications to multi-stakeholder entities, as distributed among one or more client compute nodes 1502, one or more edge gateway nodes 1512, one or more edge aggregation nodes 1522, one or more core data centers 1532, and a global network cloud 1542, as distributed across layers 1510, 1520, 1530, 1540, and 1550 of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer (of layers 1510, 1520, 1530, 1540, and 1550) corresponding to layers 1300, 1310, 1320, 1330, and 1340. For example, the client compute nodes 1502 are each located at an endpoint layer 1310, while each of the edge gateway nodes 1512 are located at an edge devices layer 1320 (local level) of the edge computing system. Additionally, each of the edge aggregation nodes 1522

(and/or fog devices 1524, if arranged or operated with or among a fog networking configuration 1526) is located at a network access layer 1530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein apply to fog networks, fogging, and fog configurations. Further, aspects of the edge computing systems discussed herein may be configured as a fog, or aspects of fog may be integrated into an edge computing architecture.

The core data center 1532 is located at a core network layer 1330 (e.g., a regional or geographically-central level), while the global network cloud 1542 is located at a cloud data center layer 1340 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 1532 may be located within, at, or near the edge cloud 1210.

Although an illustrative number of client compute nodes 1502, edge gateway nodes 1512, edge aggregation nodes 1522, core data centers 1532, and global network clouds 1542 are shown in FIG. 15, it should be appreciated that the edge computing system may include more or fewer devices or systems at each layer. Additionally, as shown in FIG. 13, the number of components of each layer 1300, 1310, 1320, 1330, and 1340 generally increases at each lower level (i.e., when moving closer to endpoints). As such, one edge gateway node 1512 may service multiple client compute nodes 1502, and one edge aggregation node 1522 may service multiple edge gateway nodes 1512.

Consistent with the examples provided herein, each client compute node 1502 may be embodied as any type of endpoint component, device, appliance, or "thing" capable of communicating as a producer or consumer of data. Further, the label "node" or "device" as used in the edge computing system of FIG. 15 does not necessarily mean that such node or device operates in a client or agent/minion/follower role; rather, any of the nodes or devices in the edge computing system of FIG. 15 refer to individual entities, nodes, or subsystems which include discrete or connected hardware or software configurations to facilitate or use the edge cloud 1210.

As such, the edge cloud 1210 is formed from network components and functional features operated by and within the edge gateway nodes 1512 and the edge aggregation nodes 1522 of layers 1320 and 1330, respectively. The edge cloud 1210 may be embodied as any type of network that provides edge computing and/or storage resources that are proximately located to a radio access network (RAN) capable endpoint devices (e.g., mobile computing devices, IoT devices, smart devices, etc.), which are shown in FIG. 13 as the client compute nodes 1502. In other words, the edge cloud 1210 may be envisioned as an "edge" that connects the endpoint devices and traditional mobile network access points that serve as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1210 may form a portion of or otherwise provide an ingress point into or across a fog networking configuration 1526 (e.g., a network of fog devices 1524, not shown in detail), which may be embodied as a system-level horizontal and distributed architecture that distributes resources and services to perform a specific function. For instance, a coordinated and distributed network of fog devices 1524 may perform computing, storage, control, or networking aspects in the context of an IoT system arrangement. Other networked, aggregated, and distributed functions may exist in the edge cloud 1210 between the cloud data center layer 1340 and the client endpoints (e.g., client compute nodes 1502). Some of these are discussed in the following sections in the context of network functions or service virtualization, including the use of virtual edges and virtual services which are orchestrated for multiple stakeholders.

The edge gateway nodes 1512 and the edge aggregation nodes 1522 cooperate to provide various edge services and security to the client compute nodes 1502. Furthermore, because each client compute node 1502 may be stationary or mobile, each edge gateway node 1512 may cooperate with other edge gateway devices to propagate presently provided edge services and security as the corresponding client compute node 1502 moves about a region. To do so, each of the edge gateway nodes 1512 and/or edge aggregation nodes 1522 may support multiple tenancies and multiple stakeholder configurations, in which services from (or hosted for) multiple service providers and multiple consumers may be supported and coordinated across a single or multiple compute devices.

In further examples, any of the compute nodes or devices discussed regarding the present computing systems and environment may be fulfilled based on the components depicted in FIGS. 16A and 16B. Each compute node may be embodied as a type of device, appliance, computer, or other "thing" capable of communicating with other edge, networking, or endpoint components.

In the simplified example depicted in FIG. 16A, a compute node 1600 (e.g., an edge compute node) includes a compute engine (also referred to herein as "compute circuitry") 1602, an input/output (I/O) subsystem 1608, data storage 1610, communication circuitry 1612, and, optionally, one or more peripheral devices 1614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1600 may be embodied as any type of engine, device, or collection of devices capable of performing various compute functions. In some examples, the compute node 1600 may be embodied as a single device such as an integrated circuit, an embedded system, a field-programmable gate array (FPGA), a system-on-a-chip (SOC), or another integrated system or device. In the illustrative example, the compute node 1600 includes or is embodied as a processor 1604 and a memory 1606. The processor 1604 may be embodied as any type of processor capable of performing the functions described herein (e.g., executing an application). For example, the processor 1604 may be embodied as a multi-core processor(s), a microcontroller, or another processor or processing/controlling circuit. In some examples, the processor 1604 may be embodied as, include, or be coupled to an FPGA, an application-specific integrated circuit (ASIC), reconfigurable hardware or hardware circuitry, or other specialized hardware to facilitate the performance of the functions described herein.

The main memory 1606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte-addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the main memory 1606 may be integrated into the processor 1604. The main memory 1606 may store various software and data used during operation such as one or more applications, data operated on by the application(s), libraries, and drivers.

The compute circuitry 1602 is communicatively coupled to other components of the compute node 1600 via the I/O subsystem 1608, which may be embodied as circuitry and/or components to facilitate input/output operations with the compute circuitry 1602 (e.g., with the processor 1604 and/or the main memory 1606) and other components of the compute circuitry 1602. For example, the I/O subsystem 1608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1608 may form a portion of a system-on-a-chip (SoC) and be incorporated, along with one or more of the processor 1604, the main memory 1606, and other components of the compute circuitry 1602, into the compute circuitry 1602.

One or more illustrative data storage devices (e.g., data storage 1610) may be embodied as any type of devices configured for short-term or long-term storage of data such as, for example, memory devices and circuits, memory cards, hard disk drives, solid-state drives, or other data storage devices. Each data storage device may include a system partition that stores data and firmware code for the data storage device. Each data storage device may also include one or more operating system partitions that store data files and executables for operating systems depending on, for example, the type of compute node 1600.

The communication circuitry 1612 may be embodied as any communication circuit, device, or collection thereof, capable of enabling communications over a network between the compute circuitry 1602 and another compute device (e.g., an edge gateway node 1512 of the compute node 1600). The communication circuitry 1612 may be configured to use any one or more communication technology (e.g., wired or wireless communications) and associated protocols (e.g., a cellular networking protocol such as a 3GPP 4G or 5G standard, a wireless local area network protocol such as IEEE 802.11/Wi-Fi®, a wireless wide area network protocol, Ethernet, Bluetooth®, etc.) to effect such communication.

The communication circuitry 1612 includes a network interface controller (NIC) 1620, which may also be referred to as a host fabric interface (HFI). The NIC 1620 may be embodied as one or more add-in-boards, daughter cards, network interface cards, controller chips, chipsets, or other devices that may be used by the compute node 1600 to connect with another compute device (e.g., an edge gateway node 1512). In some examples, the NIC 1620 may be embodied as part of a system-on-a-chip (SoC) that includes one or more processors or included on a multichip package that also contains one or more processors. In some examples, the NIC 1620 may include a local processor (not shown) and/or a local memory (not shown) that are both local to the NIC 1620. In such examples, the local processor of the NIC 1620 may be capable of performing one or more of the functions of the compute circuitry 1602 described herein. Additionally, the local memory of the NIC 1620 may be integrated into one or more components of the client compute node at the board level, socket level, chip level, and/or other levels.

Additionally, in some examples, each compute node 1600 may include one or more peripheral devices 1614. Such peripheral devices 1614 may include any type of peripheral device found in a compute device or server such as audio input devices, a display, other input/output devices, interface devices, and/or other peripheral devices, depending on the particular type of the compute node 1600. In further examples, the compute node 1600 may be embodied by a respective edge compute node in an edge computing system (e.g., client compute node 1502, edge gateway node 1512, edge aggregation node 1522) or like forms of appliances, computers, subsystems, circuitry, or other components.

In a more detailed example, FIG. 16B illustrates a block diagram of an example of components that may be present in an edge computing node 1650 for implementing the techniques (e.g., operations, processes, methods, and methodologies) described herein. The edge computing node 1650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1650, or as components otherwise incorporated within a chassis of a larger system. Further, to support the security examples provided herein, a hardware RoT (e.g., provided according to a DICE architecture) may be implemented in each IP block of the edge computing node 1650 such that any IP Block could boot into a mode where a RoT identity could be generated that may attest its identity and its current booted firmware to another IP Block or an external entity.

The edge computing node 1650 may include processing circuitry in the form of a processor 1652, which may be a microprocessor, a multi-core processor, a multithreaded processor, an ultra-low voltage processor, an embedded processor, or other known processing elements. The processor 1652 may be a part of a system on a chip (SoC) in which the processor 1652 and other components are formed into a single integrated circuit, or a single package, such as the Edison™ or Galileo™ SoC boards from Intel Corporation, Santa Clara, California. As an example, the processor 1652 may include an Intel® Architecture Core™ based processor, such as a Quark™, an Atom™, a Xeon™, an i3, an i5, an i7, an i9, or an MCU-class processor, or another such processor available from Intel®. However, any number of other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1652 may communicate with system memory 1654 over an interconnect 1656 (e.g., a bus). Any number of memory devices may be used to provide for a given amount of system memory. For example, the memory may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, storage 1658 may also couple to the processor 1652 via the interconnect 1656. In an example, the storage 1658 may be implemented via a solid-state disk drive (SSDD). Other devices that may be used for the storage 1658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 1658 may be on-die memory or registers associated with the processor 1652. However, in some examples, the storage 1658 may be implemented using a micro hard disk drive (HDD). Further, any number of new technologies may be used for the storage 1658 in addition to, or instead of, the technologies described, such as resistance change memories, phase change memories, holographic memories, or chemical memories, among others.

The components may communicate over the interconnect 1656. The interconnect 1656 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 1656 may be a proprietary bus, for example, used in an SoC-based system. Other bus systems may be included, such as an I2C interface, an SPI interface, point-to-point interfaces, and a power bus, among others.

The interconnect 1656 may couple the processor 1652 to a transceiver 1666, for communications with the connected edge devices 1662. The transceiver 1666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1662. For example, a wireless local area network (WLAN) unit may be used to implement Wi-Fi® communications following the Institute of Electrical and Electronics Engineers (IEEE) 802.11 standard. Also, wireless wide area communications, e.g., according to a cellular or other wireless wide area protocol, may occur via a wireless wide area network (WWAN) unit.

The transceiver 1666 (or multiple transceivers) may communicate using multiple standards or radios for communications at a different range. For example, the edge computing node 1650 may communicate with close devices, e.g., within about 10 meters, using a local transceiver based on BLE, or another low-power radio, to save power. More distant connected edge devices 1662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

Transceiver 1666 (e.g., a radio transceiver or another type of wireless transceiver) may be included to communicate with devices or services in the edge cloud 1695 via local or wide-area network protocols. The transceiver 1666 may be an LPWA transceiver that follows the IEEE 802.15.4, or IEEE 802.15.4g standards, among others. The edge computing node 1650 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low-bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for transceiver 1666, as described herein. For example, transceiver 1666 may include a cellular transceiver that uses spread spectrum (SPA/SAS) communications for implementing high-speed communications. Further, any number of other protocols may be used, such as Wi-Fi® networks for medium-speed communications and provision of network communications. Transceiver 1666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1668 may be included to provide wired communication to nodes of the edge cloud 1695 or other devices, such as the connected edge devices 1662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to enable connecting to a second network, for example, a first NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of the following components: acceleration circuitry 1664, transceiver 1666, NIC 1668, or sensor hub or external interface 1670. Accordingly, in various examples, applicable means for communicating (e.g., receiving, transmitting, etc.) may be embodied by such communications circuitry.

The edge computing node 1650 may include or be coupled to acceleration circuitry 1664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1656 may couple the processor 1652 to a sensor hub or external interface 1670 that is used to connect additional devices or subsystems. The devices may include sensors 1672, such as accelerometers, level sensors, flow sensors, optical light sensors, camera sensors, temperature sensors, global positioning system (GPS) sensors, pressure sensors, barometric pressure sensors, and the like. The sensor hub or external interface 1670 further may be used to connect the edge computing node 1650 to actuators 1674, such as power switches, valve actuators, an audible sound generator, a visual warning device, and the like.

In some aspects, the edge computing node 1650 can be configured to operate in a trusted execution environment 1690.

In some optional examples, various input/output (I/O) devices may be present within or connected to, the edge computing node 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1650.

A battery 1676 may power the edge computing node 1650, although, in examples in which the edge computing node 1650 is mounted in a fixed location, it may have a power supply coupled to an electrical grid. The battery 1676 may be a lithium-ion battery, or a metal-air battery, such as a zinc-air battery, an aluminum-air battery, a lithium-air battery, and the like.

A battery monitor/charger 1678 may be included in the edge computing node 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1678 may communicate the information on the battery 1676 to the processor 1652 over the interconnect 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the edge computing node 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the edge computing node 1650. A wireless battery charging circuit, such as an LTC4020 chip from Linear Technologies of Milpitas, California, among others, may be included in the battery monitor/charger 1678. The specific charging circuits may be selected based on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application-specific integrated circuit (ASIC).

In an example, the instructions 1682 provided via the memory 1654, the storage 1658, or the processor 1652 may be embodied as a non-transitory, machine-readable medium 1660 including code to direct the processor 1652 to perform electronic operations in the edge computing node 1650. The processor 1652 may access the non-transitory, machine-readable medium 1660 over the interconnect 1656. For instance, the non-transitory, machine-readable medium 1660 may be embodied by devices described for storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described concerning the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding, or carrying instructions for execution by a machine and that causes the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (object code, binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 16A and 16B are intended to depict a high-level view of the components of a device, subsystem, or arrangement of an edge computing node. However, it will be understood that some of the components shown may be omitted, additional components may be present, and a different arrangement of the components shown may occur in other implementations.

Figure 17:
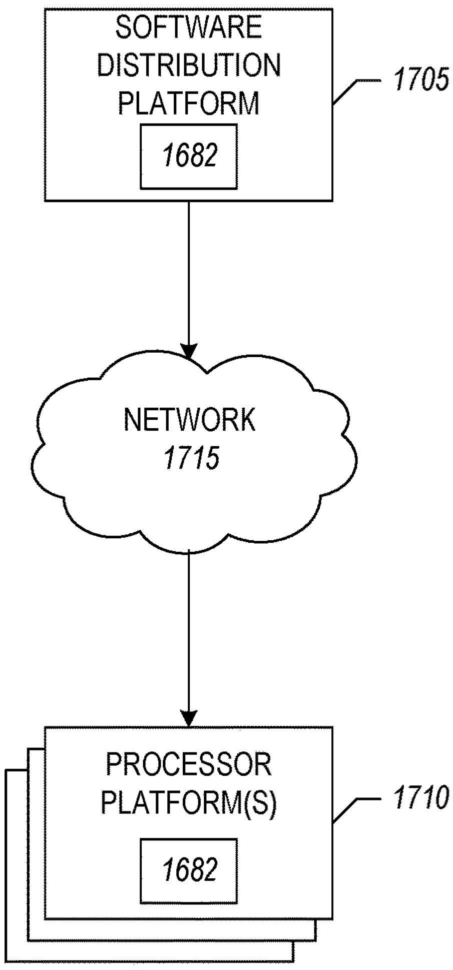
FIG. 17 illustrates a software distribution platform to distribute software instructions and derivatives, according to an example.

FIG. 17 illustrates an example software distribution platform 1705 to distribute software, such as the example computer-readable instructions 1682 of FIG. 16B, to one or more devices, such as processor platform(s) 1710 and/or other example connected edge devices or systems discussed herein. The example software distribution platform 1705 may be implemented by any computer server, data facility, cloud service, etc., capable of storing and transmitting software to other computing devices. Example connected edge devices may be customers, clients, managing devices (e.g., servers), or third parties (e.g., customers of an entity owning and/or operating the software distribution platform 1705). Example connected edge devices may operate in commercial and/or home automation environments. In some examples, a third party is a developer, a seller, and/or a licensor of software such as the example computer-readable instructions 1682 of FIG. 16B. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 17, the software distribution platform 1705 includes one or more servers and one or more storage devices that store the computer-readable instructions 1682. The one or more servers of the example software distribution platform 1705 are in communication with a network 1715, which may correspond to any one or more of the Internet and/or any of the example networks described above. In some examples, one or more servers are responsive to requests to transmit the software to a requesting party as part of a commercial transaction. Payment for the delivery, sale, and/or license of the software may be handled by one or more servers of the software distribution platform and/or via a third-party payment entity. The servers enable purchasers and/or licensors to download the computer-readable instructions 1682 from the software distribution platform 1705. For example, the software, which may correspond to example computer-readable instructions, may be downloaded to the example processor platform(s), which is/are to execute the computer-readable instructions 1682. In some examples, one or more servers of the software distribution platform 1705 are communicatively connected to one or more security domains and/or security devices through which requests and transmissions of the example computer-readable instructions 1682 must pass. In some examples, one or more servers of the software distribution platform 1705 periodically offer, transmit, and/or force updates to the software (e.g., the example computer-readable instructions 1682 of FIG. 16B) to ensure improvements, patches, updates, etc. are distributed and applied to the software at the end-user devices.

In the illustrated example of FIG. 17, the computer-readable instructions 1682 are stored on storage devices of the software distribution platform 1705 in a particular format. A format of computer-readable instructions includes but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 1682 stored in the software distribution platform 1705 are in a first format when transmitted to the example processor platform(s) 1710. In some examples, the first format is an executable binary in which particular types of processor platform(s) 1710 can execute. However, in some examples, the first format is uncompiled code that requires one or more preparation tasks to transform the first format to a second format to enable execution on the example processor platform(s) 1710. For instance, the receiving processor platform(s) 1700 may need to compile the computer-readable instructions 1682 in the first format to generate executable code in a second format that is capable of being executed on the processor platform(s) 1710. In still other examples, the first format is interpreted code that, upon reaching the processor platform(s) 1710, is interpreted by an interpreter to facilitate the execution of instructions.

Figure 18:
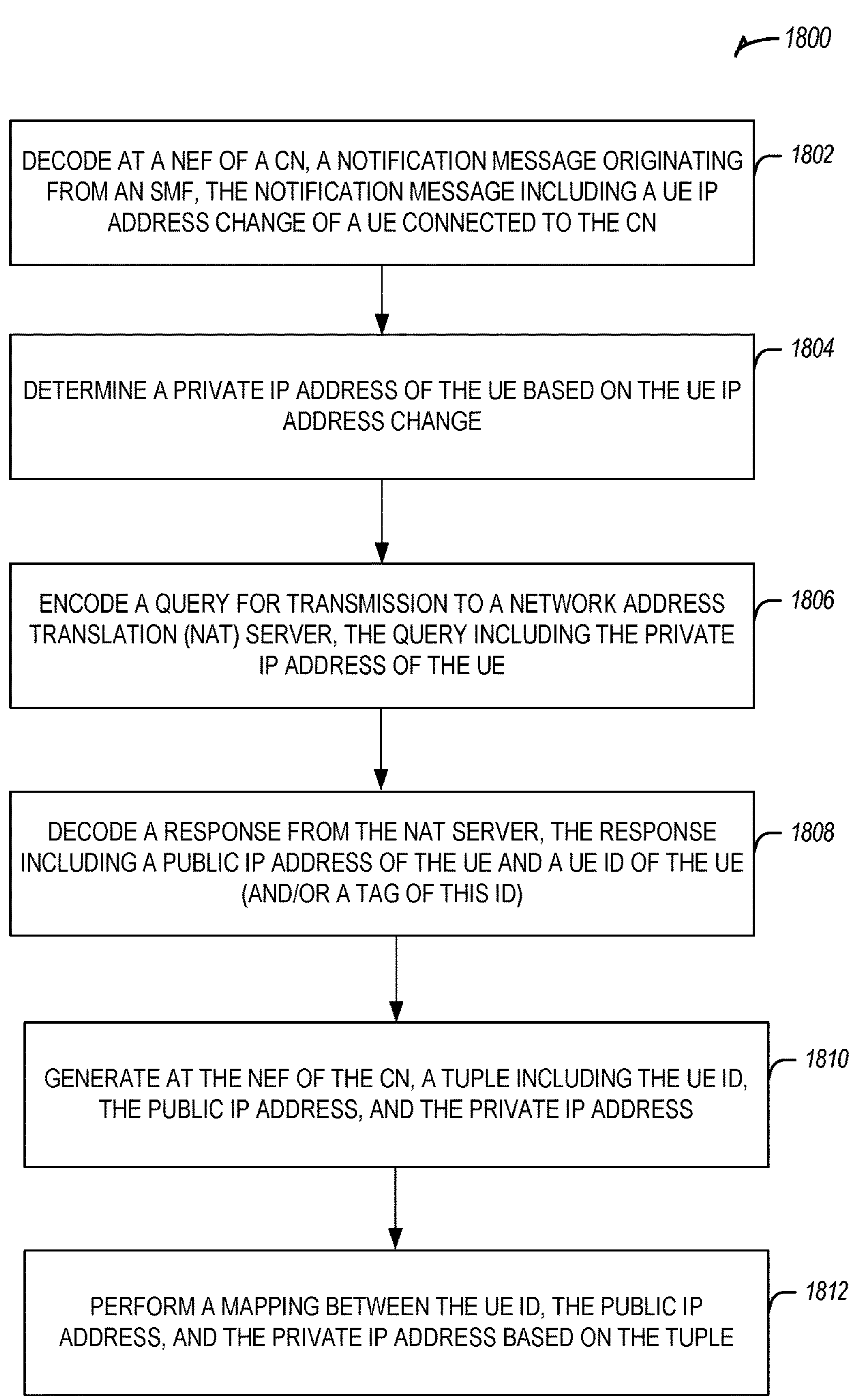
FIG. 18 illustrates a flowchart of an example method for maintaining service continuity in a Fifth Generation New Radio (5G NR) network in communication with a multi-access edge computing (MEC) system and an edge application (EDGEAPP) system, according to an example.

FIG. 18 illustrates a flowchart of an example method 1800 for maintaining service continuity in a Fifth Generation New Radio (5G NR) network in communication with a multi-access edge computing (MEC) system and an edge application (EDGEAPP) system, according to an example. The example method 1800 includes operations 1802, 1804, 1806, 1808, 1810, and 1812 which can be performed by, e.g., a computing device (such as a network node or server) configured with the NEF with the disclosed functionalities (e.g., NEF 1004 of FIG. 10).

In some aspects, method 1800 is configured as a method for maintaining service continuity in a 5G NR network in communication with a MEC system and an EDGEAPP system. At operation 1802, a notification message originating from a service management function (SMF) of a CN is decoded at a network exposure function (NEF) of the CN associated with the EDGEAPP system. The notification message includes a UE Internet protocol IP address change of a UE connected to the CN.

At operation 1804, a private IP address of the UE is determined based on the UE IP address change.

At operation 1806, a query is encoded for transmission to a network address translation (NAT) server. The query includes the private IP address of the UE.

At operation 1808, a response from the NAT server is decoded. The response includes a public IP address of the UE and a UE ID of the UE. The public IP address corresponds to the private IP address. In some embodiments, one or more tags related to the UE ID can be generated and stored. In some aspects, the one or more tags can be included in the tuple.

At operation 1810, a tuple including the UE ID, the public IP address, and the private IP address is generated at the NEF. The tuple can be stored by the NEF (e.g., at a server implementing the NEF or at a storage location accessible by the NEF).

At operation 1812, a mapping is performed between the UE ID, the public IP address, and the private IP address based on the tuple.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing system, comprising: processing circuitry; and a memory device including instructions embodied thereon, wherein the instructions, which when executed by the processing circuitry, configure the processing circuitry for maintaining service continuity in a Fifth Generation New Radio (5G NR) network in communication with a multi-access edge computing (MEC) system and an edge application (EDGEAPP) system, with operations to: decode at a network exposure function (NEF) of a core network (CN) associated with the EDGEAPP system, a notification message originating from a service management function (SMF) of the CN, the notification message including a user equipment (UE) Internet protocol (IP) address change of a UE connected to the CN; determine a private IP address of the UE based on the UE IP address change; encode a query for transmission to a network address translation (NAT) server, the query including the private IP address of the UE; decode a response from the NAT server, the response including a public IP address of the UE and a user equipment identification (UE ID) of the UE, the public IP address corresponding to the private IP address; generate at the NEF of the CN, a tuple including the UE ID, the public IP address, and the private IP address; and perform mapping between the UE ID, the public IP address, and the private IP address based on the tuple. In some embodiments, the tupple can optionally include one or more tags that correspond to the UE ID.

In Example 2, the subject matter of Example 1 optionally includes subject matter where the operations are further to: decode a UE ID request received from an edge enabler server (EES), the UE ID request originating from an application function (AF) of the CN, the AF associated with a MEC application of the MEC system and an edge application of the EDGEAPP system; and encode the UE ID for transmission to the MEC application of the MEC system or the edge application of the EDGEAPP system via the EES based on the UE ID request.

In Example 3, the subject matter of Example 2 optionally includes subject matter where the UE ID request is a Nnef_UEId_Getrequest application programming interface (API) originating from the AF, and wherein the operations are further to: decode the UE ID request to obtain the public IP address of the UE; obtain the UE ID based on the public IP address using the tuple; and encode the UE ID for transmission to the MEC application in response to the UE ID request.

In Example 4, the subject matter of Examples 1-3 optionally includes subject matter where the operations are further to: decode a UE ID request received from an edge enabler server (EES), the UE ID request originating from an edge enabler client (EEC) of the UE; and encode the UE ID for transmission to the EEC via the EES based on the UE ID request.

In Example 5, the subject matter of Example 4 optionally includes subject matter where the UE ID request originates from an application client (AC) of the UE, the AC being in communication with the EEC, and wherein the operations are further to: decode the UE ID request to obtain the private IP address of the UE; obtain the UE ID based on the private IP address using the tuple; and encode the UE ID for transmission to the AC via the EES and the EEC in response to the UE ID request.

In Example 6, the subject matter of Examples 1-5 optionally includes subject matter where the UE ID request originates from an application client (AC) of the UE, the AC being in communication with an edge enabler client (EEC) of the UE, and wherein the operations are further to: encode the UE ID request for transmission to a domain name system application function (DNS AF) of the CN.

In Example 7, the subject matter of Example 6 optionally includes subject matter where the operations are further to: resolve domain information in the UE ID request using the DNS AF to obtain the private IP address of the UE, the domain information associated with a MEC application of the MEC system or an edge application of the EDGEAPP system accessed by the AC.

In Example 8, the subject matter of Example 7 optionally includes subject matter where the operations are further to: retrieve at the DNS AF, the UE ID from the SMF of the CN.

In Example 9, the subject matter of Example 8 optionally includes subject matter where the operations are further to: cause a NAT translation of the UE ID and the private IP address using the NAT server, to obtain the public IP address.

In Example 10, the subject matter of Example 9 optionally includes subject matter where the operations are further to: generate the tuple at the DNS AF based on the NAT translation by the NAT server; and forward the tuple to the NEF of the CN.

Example 11 is a method for maintaining service continuity in a Fifth Generation New Radio (5G NR) network in communication with a multi-access edge computing (MEC) system and an edge application (EDGEAPP) system, the method comprising: decoding at a network exposure function (NEF) of a core network (CN) associated with the EDGEAPP system, a notification message originating from a service management function (SMF) of the CN, the notification message including a user equipment (UE) Internet protocol (IP) address change of a UE connected to the CN; determining a private IP address of the UE based on the UE IP address change; encoding a query for transmission to a network address translation (NAT) server, the query including the private IP address of the UE; decoding a response from the NAT server, the response including a public IP address of the UE and a user equipment identification (UE ID) of the UE, the public IP address corresponding to the private IP address; generating at the NEF of the CN, a tuple including the UE ID, the public IP address, and the private IP address; and performing mapping between the UE ID, the public IP address, and the private IP address based on the tuple.

In Example 12, the subject matter of Example 11 includes, decoding a UE ID request received from an edge enabler server (EES), the UE ID request originating from an application function (AF) of the CN, the AF associated with a MEC application of the MEC system and an edge application of the EDGEAPP system; and encoding the UE ID for transmission to the MEC application of the MEC system or the edge application of the EDGEAPP system via the EES based on the UE ID request.

In Example 13, the subject matter of Example 12 optionally includes subject matter where the UE ID request is a Nnef_UEId_Getrequest application programming interface (API) originating from the AF, and wherein the method further comprising: decoding the UE ID request to obtain the public IP address of the UE; obtaining the UE ID based on the public IP address using the tuple; and encoding the UE ID for transmission to the MEC application in response to the UE ID request.

In Example 14, the subject matter of Examples 11-13 includes, decoding a UE ID request received from an edge enabler server (EES), the UE ID request originating from an edge enabler client (EEC) of the UE; and encoding the UE ID for transmission to the EEC via the EES based on the UE ID request.

In Example 15, the subject matter of Example 14 optionally includes subject matter where the UE ID request originates from an application client (AC) of the UE, the AC being in communication with the EEC, and wherein the method further comprising: decoding the UE ID request to obtain the private IP address of the UE; obtaining the UE ID based on the private IP address using the tuple; and encoding the UE ID for transmission to the AC via the EES and the EEC in response to the UE ID request.

In Example 16, the subject matter of Examples 11-15 optionally includes subject matter where the UE ID request originates from an application client (AC) of the UE, the AC being in communication with an edge enabler client (EEC) of the UE, and wherein the method further comprising: encoding the UE ID request for transmission to a domain name system application function (DNS AF) of the CN.

In Example 17, the subject matter of Example 16 includes, resolving domain information in the UE ID request using the DNS AF to obtain the private IP address of the UE, the domain information associated with a MEC application of the MEC system, or an edge application of the EDGEAPP system accessed by the AC.

In Example 18, the subject matter of Example 17 includes, retrieving at the DNS AF, the UE ID from the SMF of the CN.

In Example 19, the subject matter of Example 18 includes, causing a NAT translation of the UE ID and the private IP address using the NAT server, to obtain the public IP address; generating the tuple at the DNS AF based on the NAT translation by the NAT server; and forwarding the tuple to the NEF of the CN.

Example 20 is a non-transitory computer-readable storage medium that stores instructions for execution by one or more processors of a computing node in a Fifth Generation New Radio (5G NR) network in communication with a multi-access edge computing (MEC) system and an edge application (EDGEAPP) system, the instructions to configure the computing node for service continuity and to cause the computing node to perform operations comprising: decoding at a network exposure function (NEF) of a core network (CN) of the 5G NR network, a notification message originating from a service management function (SMF) of the CN, the notification message including a user equipment (UE) Internet protocol (IP) address change of a UE connected to the CN; determining a private IP address of the UE based on the UE IP address change; encoding a query for transmission to a network address translation (NAT) server, the query including the private IP address of the UE; decoding a response from the NAT server, the response including a public IP address of the UE and a user equipment identification (UE ID) of the UE, the public IP address corresponding to the private IP address; generating at the NEF of the CN, a tuple including the UE ID, the public IP address, and the private IP address; and performing mapping between the UE ID, the public IP address, and the private IP address based on the tuple.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although these implementations have been described concerning specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing system, comprising:

processing circuitry; and a memory device including instructions embodied thereon, wherein the instructions, which when executed by the processing circuitry, configure the processing circuitry for maintaining service continuity in a Fifth Generation New Radio (5G NR) network in communication with a multi-access edge computing (MEC) system and an edge application (EDGEAPP) system, with operations to:

decode at a network exposure function (NEF) of a core network (CN) associated with the EDGEAPP system, a notification message originating from a service management function (SMF) of the CN, the notification message including a user equipment (UE) Internet protocol (IP) address change of a UE connected to the CN;

determine a private IP address of the UE based on the UE IP address change;

encode a query for transmission to a network address translation (NAT) server, the query including the private IP address of the UE;

decode a response from the NAT server, the response including a public IP address of the UE and a user equipment identification (UE ID) of the UE, the public IP address corresponding to the private IP address;

generate at the NEF of the CN, a tuple including the UE ID, the public IP address, and the private IP address; and perform a mapping between the UE ID, the public IP address, and the private IP address based on the tuple, the NAT query to obtain the public IP address and the UE ID being initiated by the NEF, and, when a domain name system application function (DNS AF) of the CN is present, the DNS AF generates the tuple and forwards the tuple to the NEF.

2. The computing system of claim 1, wherein the operations are further to:

decode a UE ID request received from an edge enabler server (EES), the UE ID request originating from an application function (AF) of the CN, the AF associated with a MEC application of the MEC system and an edge application of the EDGEAPP system; and encode the UE ID for transmission to the MEC application of the MEC system or the edge application of the EDGEAPP system via the EES based on the UE ID request.

3. The computing system of claim 2, wherein the UE ID request is a Nnef_UEId_Getrequest application programming interface (API) originating from the AF, and wherein the operations are further to:

decode the UE ID request to obtain the public IP address of the UE;

obtain the UE ID based on the public IP address using the tuple; and encode the UE ID for transmission to the MEC application in response to the UE ID request.

4. The computing system of claim 1, wherein the operations are further to:

decode a UE ID request received from an edge enabler server (EES), the UE ID request originating from an edge enabler client (EEC) of the UE; and encode the UE ID for transmission to the EEC via the EES based on the UE ID request.

5. The computing system of claim 4, wherein the UE ID request originates from an application client (AC) of the UE, the AC being in communication with the EEC, and wherein the operations are further to:

decode the UE ID request to obtain the private IP address of the UE;

obtain the UE ID based on the private IP address using the tuple; and encode the UE ID for transmission to the AC via the EES and the EEC in response to the UE ID request.

6. The computing system of claim 4, wherein the UE ID request originates from an application client (AC) of the UE, the AC being in communication with an edge enabler client (EEC) of the UE, and wherein the operations are further to:

encode the UE ID request for transmission to the DNS AF of the CN.

7. The computing system of claim 6, wherein the operations are further to:

resolve domain information in the UE ID request using the DNS AF to obtain the private IP address of the UE, the domain information associated with a MEC application of the MEC system or an edge application of the EDGEAPP system accessed by the AC.

8. The computing system of claim 7, wherein the operations are further to:

retrieve at the DNS AF, the UE ID from the SMF of the CN.

9. The computing system of claim 8, wherein the operations are further to:

cause a NAT translation of the UE ID and the private IP address using the NAT server, to obtain the public IP address.

10. The computing system of claim 9, wherein the operations are further to:

generate the tuple at the DNS AF based on the NAT translation by the NAT server; and forward the tuple to the NEF of the CN.

11. A method for maintaining service continuity in a Fifth Generation New Radio (5G NR) network in communication with a multi-access edge computing (MEC) system and an edge application (EDGEAPP) system, the method comprising:

decoding at a network exposure function (NEF) of a core network (CN) associated with the EDGEAPP system, a notification message originating from a service management function (SMF) of the CN, the notification message including a user equipment (UE) Internet protocol (IP) address change of a UE connected to the CN;

determining a private IP address of the UE based on the UE IP address change;

encoding a query for transmission to a network address translation (NAT) server, the query including the private IP address of the UE;

decoding a response from the NAT server, the response including a public IP address of the UE and a user equipment identification (UE ID) of the UE, the public IP address corresponding to the private IP address;

generating at the NEF of the CN, a tuple including the UE ID, the public IP address, and the private IP address; and performing a mapping between the UE ID, the public IP address, and the private IP address based on the tuple, the NAT query to obtain the public IP address and the UE ID being initiated by the NEF, and, when a domain name system application function (DNS AF) of the CN is present, the DNS AF generates the tuple and forwards the tuple to the NEF.

12. The method of claim 11, further comprising:

decoding a UE ID request received from an edge enabler server (EES), the UE ID request originating from an application function (AF) of the CN, the AF associated with a MEC application of the MEC system and an edge application of the EDGEAPP system; and encoding the UE ID for transmission to the MEC application of the MEC system or the edge application of the EDGEAPP system via the EES based on the UE ID request.

13. The method of claim 12, wherein the UE ID request is a Nnef_UEId_Getrequest application programming interface (API) originating from the AF, and wherein the method further comprising:

decoding the UE ID request to obtain the public IP address of the UE;

obtaining the UE ID based on the public IP address using the tuple; and encoding the UE ID for transmission to the MEC application in response to the UE ID request.

14. The method of claim 11, further comprising:

decoding a UE ID request received from an edge enabler server (EES), the UE ID request originating from an edge enabler client (EEC) of the UE; and encoding the UE ID for transmission to the EEC via the EES based on the UE ID request.

15. The method of claim 14, wherein the UE ID request originates from an application client (AC) of the UE, the AC being in communication with the EEC, and wherein the method further comprising:

decoding the UE ID request to obtain the private IP address of the UE;

obtaining the UE ID based on the private IP address using the tuple; and encoding the UE ID for transmission to the AC via the EES and the EEC in response to the UE ID request.

16. The method of claim 14, wherein the UE ID request originates from an application client (AC) of the UE, the AC being in communication with an edge enabler client (EEC) of the UE, and wherein the method further comprising:

encoding the UE ID request for transmission to the DNS AF of the CN.

17. The method of claim 16, further comprising:

resolving domain information in the UE ID request using the DNS AF to obtain the private IP address of the UE, the domain information associated with a MEC application of the MEC system or an edge application of the EDGEAPP system accessed by the AC.

18. The method of claim 17, further comprising:

retrieving at the DNS AF, the UE ID from the SMF of the CN.

19. The method of claim 18, further comprising:

causing a NAT translation of the UE ID and the private IP address using the NAT server, to obtain the public IP address;

generating the tuple at the DNS AF based on the NAT translation by the NAT server; and forwarding the tuple to the NEF of the CN.

20. A non-transitory computer-readable storage medium that stores instructions for execution by one or more processors of a computing node in a Fifth Generation New Radio (5G NR) network in communication with a multi-access edge computing (MEC) system and an edge application (EDGEAPP) system, the instructions to configure the computing node for service continuity and to cause the computing node to perform operations comprising:

decoding at a network exposure function (NEF) of a core network (CN) of the 5G NR network, a notification message originating from a service management function (SMF) of the CN, the notification message including a user equipment (UE) Internet protocol (IP) address change of a UE connected to the CN;

determining a private IP address of the UE based on the UE IP address change;

encoding a query for transmission to a network address translation (NAT) server, the query including the private IP address of the UE;

decoding a response from the NAT server, the response including a public IP address of the UE and a user equipment identification (UE ID) of the UE, the public IP address corresponding to the private IP address;

generating at the NEF of the CN, a tuple including the UE ID, the public IP address, and the private IP address; and performing a mapping between the UE ID, the public IP address, and the private IP address based on the tuple, the NAT query to obtain the public IP address and the UE ID being initiated by the NEF, and, when a domain name system application function (DNS AF) of the CN is present, the DNS AF generates the tuple and forwards the tuple to the NEF.

* * * * *